United States Patent
Hagai et al.

(10) Patent No.: US 7,126,989 B2
(45) Date of Patent: Oct. 24, 2006

(54) IMAGE CODING METHOD AND IMAGE DECODING METHOD

(75) Inventors: Makoto Hagai, Moriguchi (JP); Shinya Kadono, Nishinomiya (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 235 days.

(21) Appl. No.: 10/416,002

(22) PCT Filed: Sep. 11, 2002

(86) PCT No.: PCT/JP02/09244

§ 371 (c)(1),
(2), (4) Date: May 6, 2003

(87) PCT Pub. No.: WO03/026314

PCT Pub. Date: Mar. 27, 2003

(65) Prior Publication Data

US 2004/0032908 A1   Feb. 19, 2004

(30) Foreign Application Priority Data

Sep. 12, 2001 (JP) .............................. 2001-276280

(51) Int. Cl.
H04N 7/12     (2006.01)
(52) U.S. Cl. .................... 375/240.13; 382/238
(58) Field of Classification Search .......... 375/240.12, 375/240.13, 240.16, 240.25, 240.27; 382/236, 268, 238; 348/413.1, 416.1
See application file for complete search history.

(56) References Cited

U.S. PATENT DOCUMENTS

| | | | |
|---|---|---|---|
| 5,724,098 A * | 3/1998 | Murakami et al. | 348/416.1 |
| 6,041,145 A * | 3/2000 | Hayashi et al. | 382/268 |
| 6,212,236 B1 * | 4/2001 | Nishida et al. | 375/240.12 |
| 6,249,610 B1 | 6/2001 | Matsumoto et al. | |
| 6,466,625 B1 * | 10/2002 | Kobayashi et al. | 375/240.29 |
| 6,526,096 B1 * | 2/2003 | Lainema et al. | 375/240.16 |
| 6,853,752 B1 * | 2/2005 | Tan et al. | 382/236 |

FOREIGN PATENT DOCUMENTS

| | | |
|---|---|---|
| EP | 0 603 878 | 6/1994 |
| JP | 63-309082 | 12/1988 |

(Continued)

OTHER PUBLICATIONS

Joint Video Team (JVT) of ISO/IEC MPEG and ITU-T VCEG, Text of Commitee Draft of Joint Video Specification (ITU-T Rec. H.264, ISO/IEC 14496-10 AVC) [MPEG02/N4810][JVT-C167], ISO/IEC JTC1/SC29/WG11, May 2002, pp. 59-64.

*Primary Examiner*—Gims Philippe
(74) *Attorney, Agent, or Firm*—Wenderoth, Lind & Ponack, L.L.P.

(57) ABSTRACT

A picture coding apparatus (300) is a picture coding apparatus that codes a difference between picture data (Img) representing an input picture and predictive picture data (Pred) representing a predictive picture for the input picture and generates coded picture data, and includes a picture decoding unit (104) for decoding coded picture data (Img) after the picture data (Img) is coded; inter pixel filters A and B (303 and 304) for performing inter pixel filter operation for decoded picture data (Recon) obtained by the picture decoding unit (104); switches (301 and 302) for selecting one of the inter pixel filters; and an inter picture predicting unit (108) for generating the predictive picture data (Pred) for the input picture data (Img) using filtered decoded picture data (FilteredImg1), as reference picture data (Ref), obtained by the selected inter pixel filter.

1 Claim, 24 Drawing Sheets

FOREIGN PATENT DOCUMENTS

JP 3-136586 6/1991
JP 6-38197 2/1994

* cited by examiner

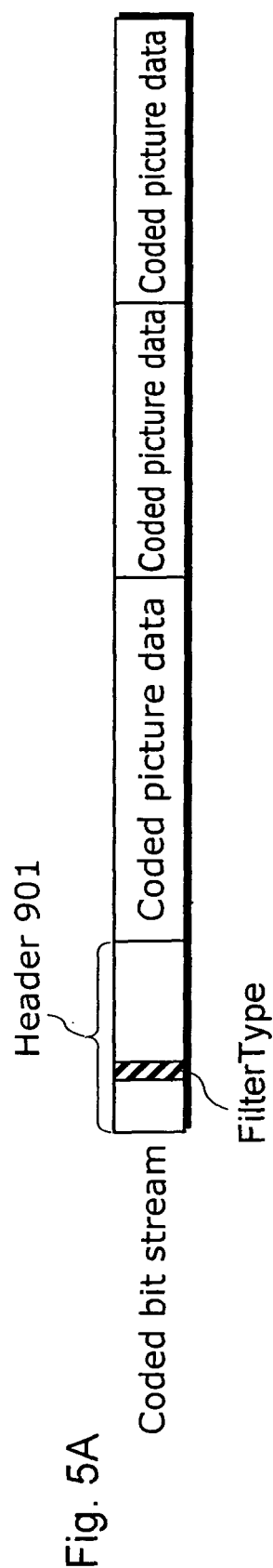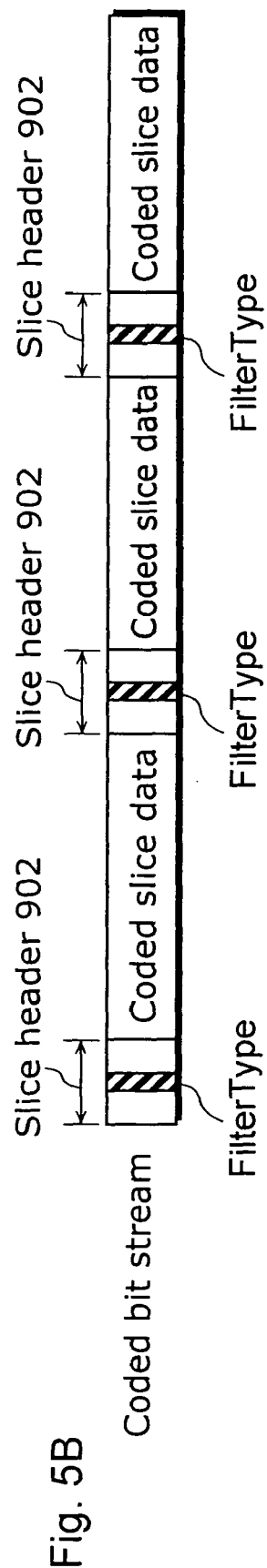
Fig. 5A
Fig. 5B

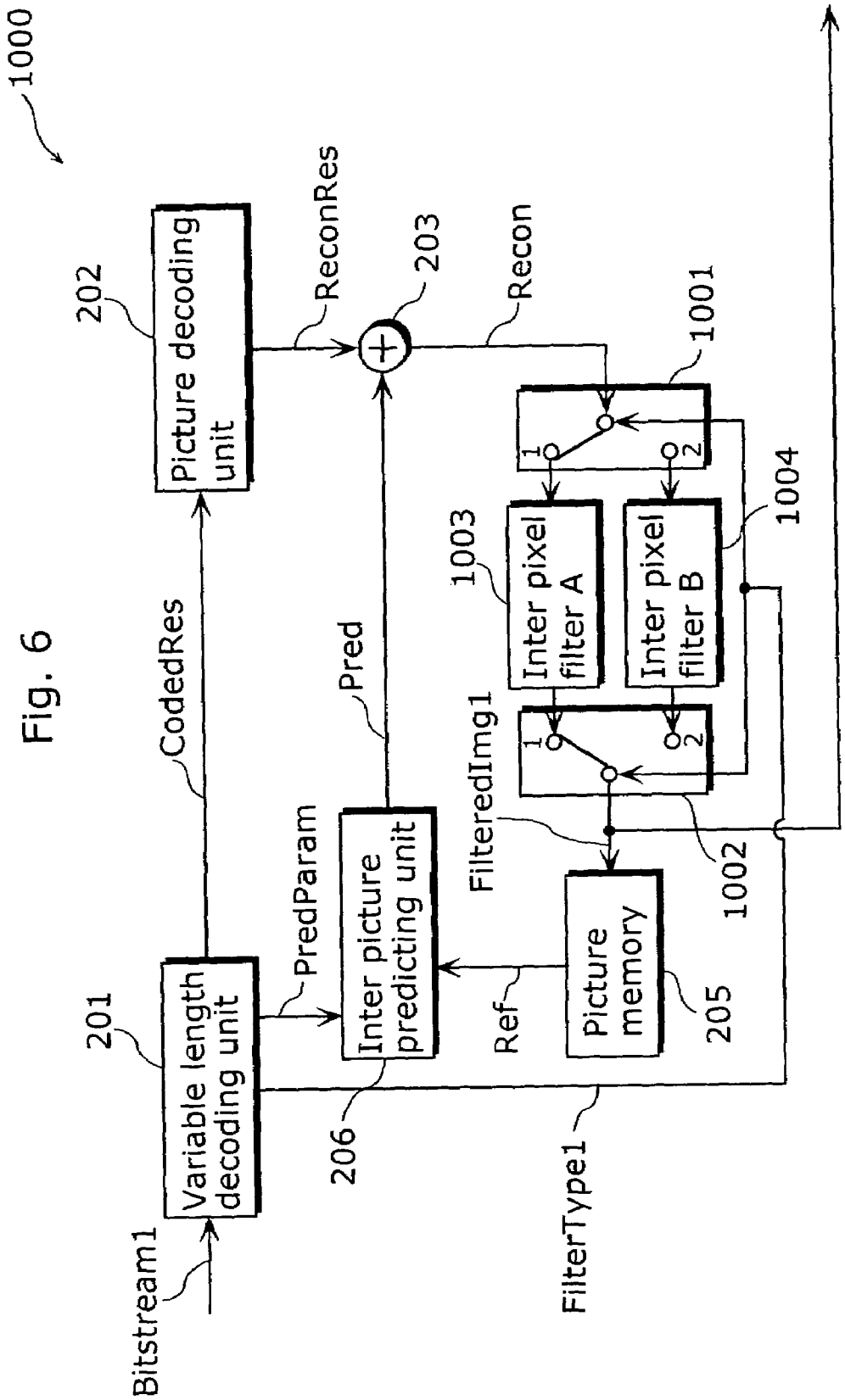

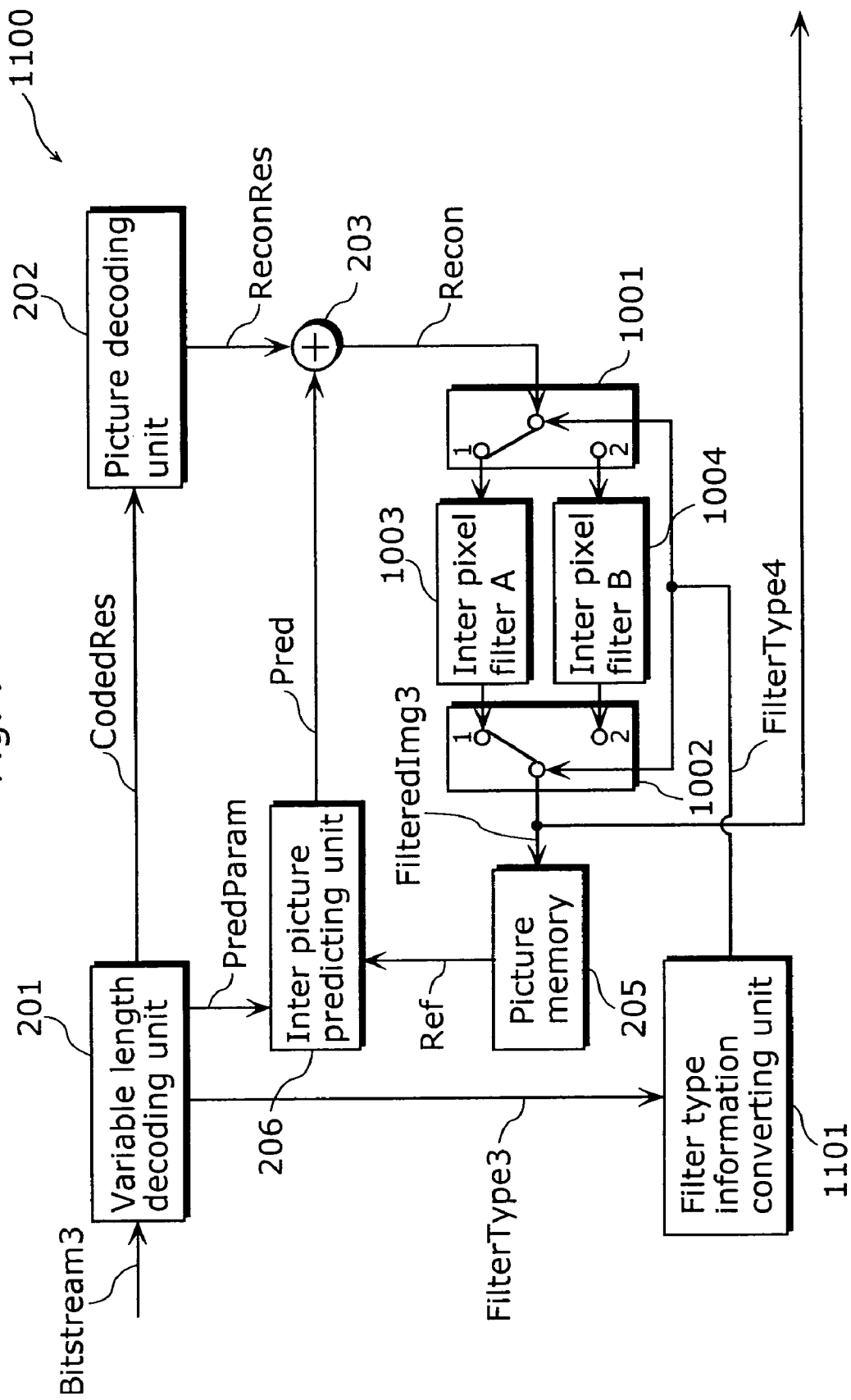

IMAGE CODING METHOD AND IMAGE DECODING METHOD

TECHNICAL FIELD

The present invention relates to a picture coding method, a picture decoding method, a picture coding apparatus, a picture decoding apparatus, a program for executing such methods in the form of software, and a recording medium on which the program is recorded.

BACKGROUND ART

With the development of multimedia applications, it has become common in recent years to handle information of all sorts of media such as audio, video and text in an integrated manner. In doing so, it becomes possible to handle media integrally by digitalizing all the media. However, since digitalized pictures have an enormous amount of data, information compression techniques are of absolute necessity for their storage and transmission. On the other hand, in order to interoperate compressed picture data, standardization of compression techniques is also important. Standards on picture compression techniques include H. 261 and H. 263 recommended by ITU-T (International Telecommunication Union Telecommunication Standardization Sector), and MPEG (Moving Picture Experts Group)-1, MPEG-2 and MPEG-4 of ISO (International Organization for Standardization).

FIG. 1 is a block diagram showing a structure of a conventional picture coding apparatus 100. Note that, in the present invention, the unit consisting of one sheet of image is referred to as a picture. In an interlace image signal, a picture means a field or a frame, and in a progressive image signal, a picture means a frame.

The picture coding apparatus 100 includes a difference calculator 101, a picture coding unit 102, a variable length coding unit 103, a picture decoding unit 104, an adder 105, an inter pixel filter 106, a picture memory 107, an inter picture predicting unit 108, and an inter picture prediction estimating unit 109. The difference calculator 101 subtracts a predictive picture inputted to a minus input terminal from an input picture inputted to a plus input terminal so as to output the differential picture. The picture coding unit 102 codes the inputted differential picture. For example, the picture coding unit 102 codes the inputted data by performing frequency transformation of it using DCT or the like and quantizing the frequency data as the transformation result. The variable length coding unit 103 performs variable length coding of the coded differential picture and predictive parameters from the inter picture prediction estimating unit 109, adds relevant data such as a header describing information relevant to the resulting coded data to it, formats it into an output coded bit stream, and outputs it outside the picture coding apparatus 100. The picture decoding unit 104 decodes the differential picture coded by the picture coding unit 102, by performing processing inverse to the coding by the picture coding unit 102 for the differential picture. For example, after performing inverse quantization of the coded differential picture, the picture decoding unit 104 performs inverse frequency transformation such as inverse DCT to decode the difference between the input picture and the predictive picture. The adder 105 adds the decoded differential picture and the predictive picture to decode the input picture. The inter pixel filter 106 performs filtering such as suppressing coding noise in the high frequency components of the decoded input picture. The picture memory 107 holds the picture data of at least one picture among the pictures decoded by the adder 105 as a reference picture. The inter picture predicting unit 108 reads out a predictive picture from the reference picture in the picture memory 107 based on the prediction result obtained by the inter picture prediction estimating unit 109. The inter picture prediction estimating unit 109 derives a predictive parameter PredParam that is the amount of change in motion of the input picture from the reference picture.

More specifically, picture data Img is inputted to the picture coding apparatus 100 from outside. The picture data Img is inputted to the plus input terminal of the difference calculator 101. The difference calculator 101 calculates the difference between the pixel values of this picture data Img and the predictive picture data Pred inputted to the minus input terminal to output the result as differential picture data Res. This predictive picture data Pred is obtained in the following manner. First, reference picture data Ref, that is an image of an already coded picture, and is once coded and then decoded to be an image for one picture, is stored in the picture memory 107. Next, from this reference picture data Ref, data representing an image corresponding to each block in the inputted picture data Img is extracted based on the predictive parameter PredParam. The data representing this image of each block is the predictive picture data Pred. The picture coding apparatus 100 stores several sheets of coded pictures as reference picture data Ref for prediction in the picture memory 107, and the inter picture predicting unit 108 generates predictive picture data Pred from the reference picture data Ref stored in the picture memory 107. The inter picture prediction estimating unit 109 obtains predictive parameter data PredParam used for prediction (for instance, motion vector information used in the MPEG picture coding method, and the like) from the input picture data Img and the reference picture data Ref. Note that pixel values of a predictive picture shall be "0" in the case of intra picture coding.

The picture coding unit 102 codes differential picture data Res, and outputs it as coded differential picture data CodedRes. The picture decoding unit 104 decodes the coded differential picture data CodedRes and outputs it as decoded differential picture data ReconRes in order to use it as a reference picture for inter picture prediction. The pixel values indicated by this decoded differential picture data ReconRes and pixel values indicated by the predictive picture data Pred are added by the adder 105 and outputted as decoded picture data Recon. The inter pixel filter 106 performs filter operation processing for the decoded picture data Recon, and stores it as filtered decoded picture data FilteredImg in the picture memory 107.

The inter pixel filter 106 has the effect of reducing coding noise of decoded picture data Recon and improving prediction efficiency if the picture is used as a reference picture. As an example of the inter pixel filter 106, there is an H. 261 loop filter recommended by ITU-T. The filtered decoded picture data FilteredImg which has been performed of the inter pixel filter operation by the inter pixel filter 106 is stored in the picture memory 107, and used as a reference picture when the following pictures are coded. The variable length coding unit 103 performs variable length coding of the coded differential picture data CodedRes and the predictive parameter data PredParam, and puts them together into one coded data Bitstream to output the result outside the picture coding apparatus 100. FIG. 2 is a block diagram showing the structure of a conventional picture decoding apparatus 200. The picture decoding apparatus 200 includes a variable length decoding unit 201, a picture decoding unit 202, an adder 203, an inter pixel filter 204, a picture memory 205 and an inter picture predicting unit 206. The coded data Bitstream is inputted to the picture decoding apparatus 200 from outside. The variable length decoding unit 201 performs variable length decoding of the inputted coded data Bitstream, and separates it into coded differential picture data CodedRes and predictive parameter data PredParam. The picture decoding unit 202 decodes the coded differential picture data CodedRes and outputs it as decoded differential picture data ReconRes. Note that a picture which has been referred to by a picture outputted as the decoded differential picture data ReconRes, that is, a picture corresponding to the reference picture data Ref in the picture coding apparatus 100, has been already decoded and stored in the picture memory 107. Therefore, the inter picture predicting unit 206 generates predictive picture data Pred from the reference picture data Ref based on the predictive parameter data PredParam. The adder 203 adds the predictive picture data Pred and the decoded differential picture data ReconRes to output the result as decoded picture data Recon. The inter pixel filter 204 performs inter pixel filter operation of the decoded picture data Recon, and outputs the result as filtered decoded picture data FilteredImg outside the picture decoding apparatus 200. The outside of the picture decoding apparatus 200 means a display apparatus such as a television. And, the filtered decoded picture data FilteredImg is stored in the picture memory 205 and referred to as reference picture data Ref for the following pictures.

However, if considering the case of transmitting moving pictures via a mobile phone or the like, it is desired to minimize power consumption of a mobile apparatus as a whole in order to make available hours per charge longer, so it is not desirable for the apparatus to have high processing capability which requires a larger amount of power for picture processing. Therefore, in using a mobile apparatus which can use only an operating unit with low processing capability for picture processing, there is sometimes the case where it can use only an inter pixel filter which is required of a small processing load. Meanwhile, it is sometimes requested to use a high-performance inter pixel filter for some applications that strongly require transmission of high quality moving pictures and high coding efficiency, even if an operating unit is required of larger processing load. If a coding method is capable of responding to such requirements flexibly, it is useful with the expanding range of applications to a picture coding apparatus and picture decoding apparatus according to such a coding method and decoding method.

The present invention has been conceived in view of these conventional problems, and aims at providing a picture coding apparatus that uses an inter pixel filter selectively depending on various situations so as to generate coded data, and a picture decoding apparatus that decodes the coded data.

DISCLOSURE OF INVENTION

The picture coding apparatus according to the present invention is a picture coding apparatus that codes differential picture data that is a difference between input picture data representing an input picture and predictive picture data representing a predictive picture for a picture in the input picture, so as to generate coded picture data, the picture coding apparatus comprising: a decoding unit operable to decode the coded differential picture data and add the decoded differential picture data and the predictive picture data, after the differential picture data is coded; a plurality of inter pixel filters for performing an inter pixel filtering for the decoded picture data obtained by the decoding unit; a selecting unit operable to select one of the plurality of inter pixel filters; and a predictive picture generating unit operable to generate the predictive picture data for the input picture data, using the filtered decoded picture data, as reference picture data, obtained by the selected inter pixel filter.

Therefore, there is an effect that the picture coding apparatus according to the present invention is capable of switching to an appropriate inter pixel filter depending on the processing capability on the picture coding apparatus side, the processing capability on the picture decoding apparatus side that receives a coded signal, or the properties, compression rates and so on of a picture to be coded, so as to create the coded signal.

Also, the picture decoding apparatus according to the present invention is a picture decoding apparatus that decodes coded picture data obtained by coding a difference between picture data representing a picture in original moving pictures and predictive picture data representing another picture in the original moving pictures to generate a plurality of picture data representing the original moving pictures, the picture decoding apparatus comprising: a decoding unit operable to add the decoding result of the coded picture data and the already decoded predictive picture data associated with the coded picture data to generate picture data representing an original picture; a selecting unit operable to select one of a plurality of inter pixel filters for performing an inter pixel filtering for the decoded picture data; and a predictive picture generating unit operable to generate the predictive picture data associated with another coded picture data from the picture data which is performed of the filtering by the selected inter pixel filter.

Therefore, there is an effect that the picture decoding apparatus according to the present invention is capable of selecting an inter pixel filter depending on the processing capability of the picture decoding apparatus or whether a picture is referred to or not, so as to generate a predictive picture. Also, when the picture coding apparatus switches the inter pixel filter, the picture decoding apparatus can also perform decoding properly using the corresponding inter pixel filter.

Further, the picture coding apparatus (or the picture decoding apparatus) according to the present invention is a picture coding apparatus or the like that codes pictures which are inputted in sequence, the picture coding apparatus comprising: a coding unit operable to code a picture by performing predetermined transformation processing for the picture; an inverse transformation unit operable to perform inverse transformation processing to the transformation processing for the picture coded by the coding unit; a filtering unit operable to perform filtering for the picture; a memorizing unit operable to memorize the picture; and a controlling unit operable to perform control so as to store the picture obtained by the inverse transformation processing by the inverse transformation unit in the memorizing unit after the filtering is performed by the filtering unit, or to store the picture in the memorizing unit without the filtering being performed by the filtering unit, wherein the coding unit codes the picture with reference to a past picture which has been stored in the memorizing unit.

Thereby, inter pixel filtering such as noise removal is not always performed in picture coding (or picture decoding), but it can be performed selectively when necessary, so it becomes possible even for a picture coding apparatus (or a picture decoding apparatus) with lower processing capability to adopt an inter pixel filter by performing inter pixel filtering for only a picture which has a significant influence on picture quality, and thus the effect of improving picture quality significantly at a low bit rate can be obtained.

Here, the controlling unit may perform control so as to perform the filtering when a significance level of the picture is high, and not to perform the filtering when the significance level of the picture is low. For example, the controlling unit may judge that the significance level of the picture is high and perform control so as to perform the filtering for the picture when the picture is intra picture coded by the coding unit, and judge that the significance level of the picture is low and perform control so as not to perform the filtering for the picture when the picture is inter picture coded by the coding unit. Or, the controlling unit may judge that the significance level of the picture is high and perform control so as to perform the filtering for the picture when the picture is forward predictive coded by the coding unit, and judge that the significance level of the picture is low and perform control so as not to perform the filtering for the picture when the picture is bi-predictive coded by the coding unit. Or, the controlling unit may judge that the significance level of the picture is high and perform control so as to perform the filtering for the picture when the picture is base layer coded by the coding unit, and judge that the significance level of the picture is low and perform control so as not to perform the filtering for the picture when the picture is enhancement layer coded by the coding unit.

Thereby, inter pixel filtering is performed for a picture having a significant influence on other pictures, that is, an intra picture coded picture, a forward predictive coded picture, a base layer picture or the like by priority, so the effect of improving picture quality such as noise removal by an inter pixel filter can be obtained more powerfully, even with the same increase in the processing load.

Also, the controlling unit may monitor whether or not the picture coding apparatus (or the picture decoding apparatus) has enough processing capacity, and perform control so as to perform the filtering for pictures including pictures with lower significance levels if the picture coding apparatus has enough processing capacity, and not to perform the filtering for pictures including pictures with higher significance levels if the picture coding apparatus does not have enough processing capacity. For example, a priority corresponding to the significance level is associated with the picture, and the controlling unit may monitor an operation rate of a CPU included in the picture coding apparatus to monitor the processing capacity, and performs control so as to perform the filtering for only the pictures with higher priorities if the operation rate is high, and not to perform the filtering for the pictures including the pictures with lower priorities if the operation rate is low.

Thereby, since ON/OFF of filtering can be controlled so as to make full use of the processing capability of the picture coding apparatus (or the picture decoding apparatus), a CPU is used with high efficiency, and thus coding (or decoding) for high picture quality can be realized even with the same hardware resources.

As described above, according to the present invention, the picture coding and picture decoding at a low bit rate (high compression rate) for high picture quality are realized, and particularly, the significant effect of improving picture quality can be achieved in picture coding processing and picture decoding processing by software under limited hardware resources, and thus it can be said that the practical value of the present invention is extremely high in these days when information communication technology and computers have become widespread.

BRIEF DESCRIPTION OF DRAWINGS

FIG. 5A is a diagram showing the stream structure of coded data Bitstream outputted from the picture coding apparatus of the present invention. FIG. 5B is a diagram showing the stream structure of coded data Bitstream outputted when the picture coding apparatus of the present invention switches an inter pixel filter in the unit of a slice.

FIG. 6 is a block diagram showing the structure of a picture decoding apparatus that decodes coded data Bitstream1 generated by the picture coding apparatus according to the first embodiment.

FIG. 7 is a block diagram showing the structure of a picture decoding apparatus that uses a built-in inter pixel filter in place of a specified inter pixel filter if it is not included in the picture decoding apparatus.

BEST MODE FOR CARRYING OUT THE INVENTION

FIRST EMBODIMENT

Figure 1:
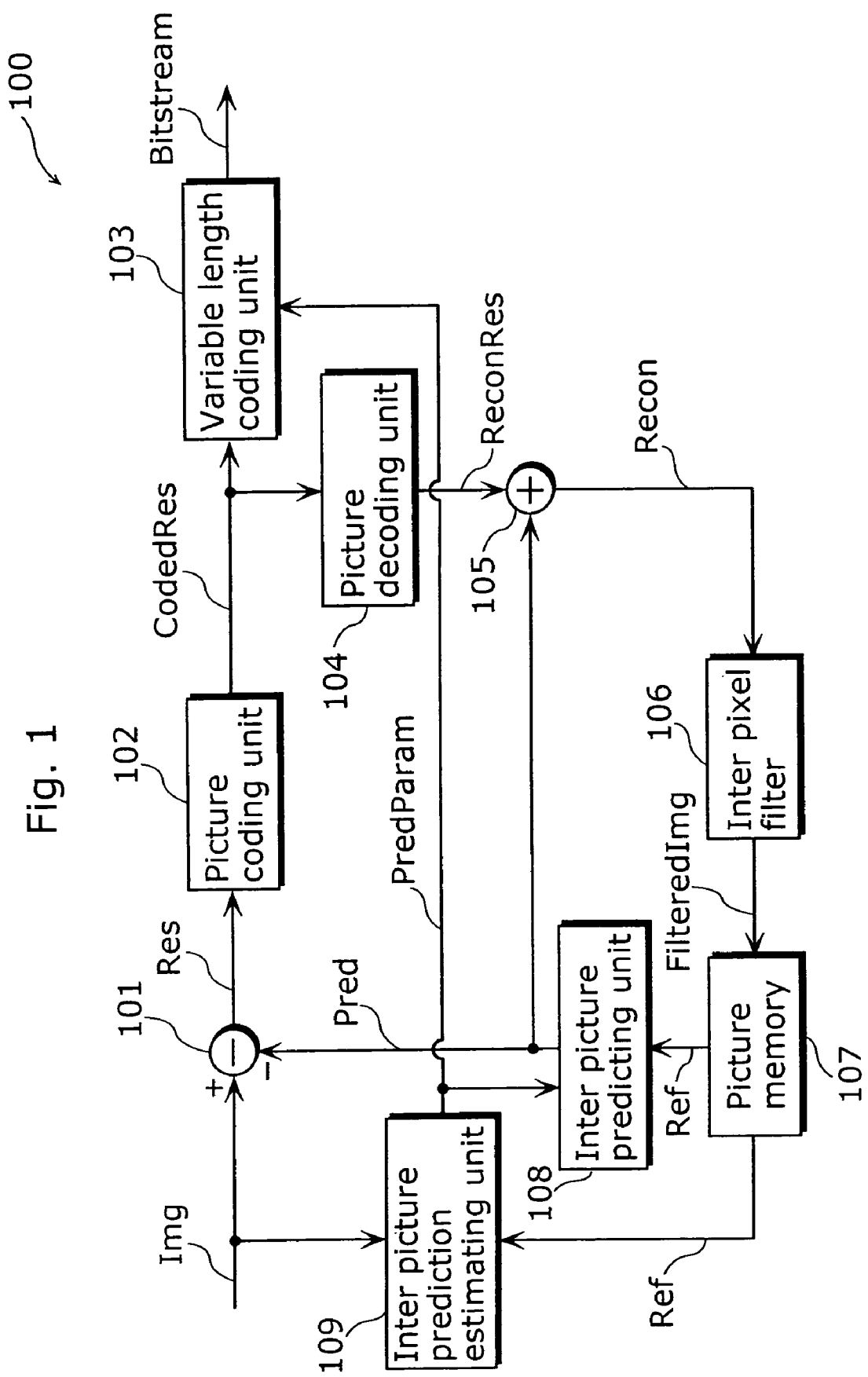
FIG. 1 is a block diagram showing the structure of a conventional picture coding apparatus.
Figure 2:
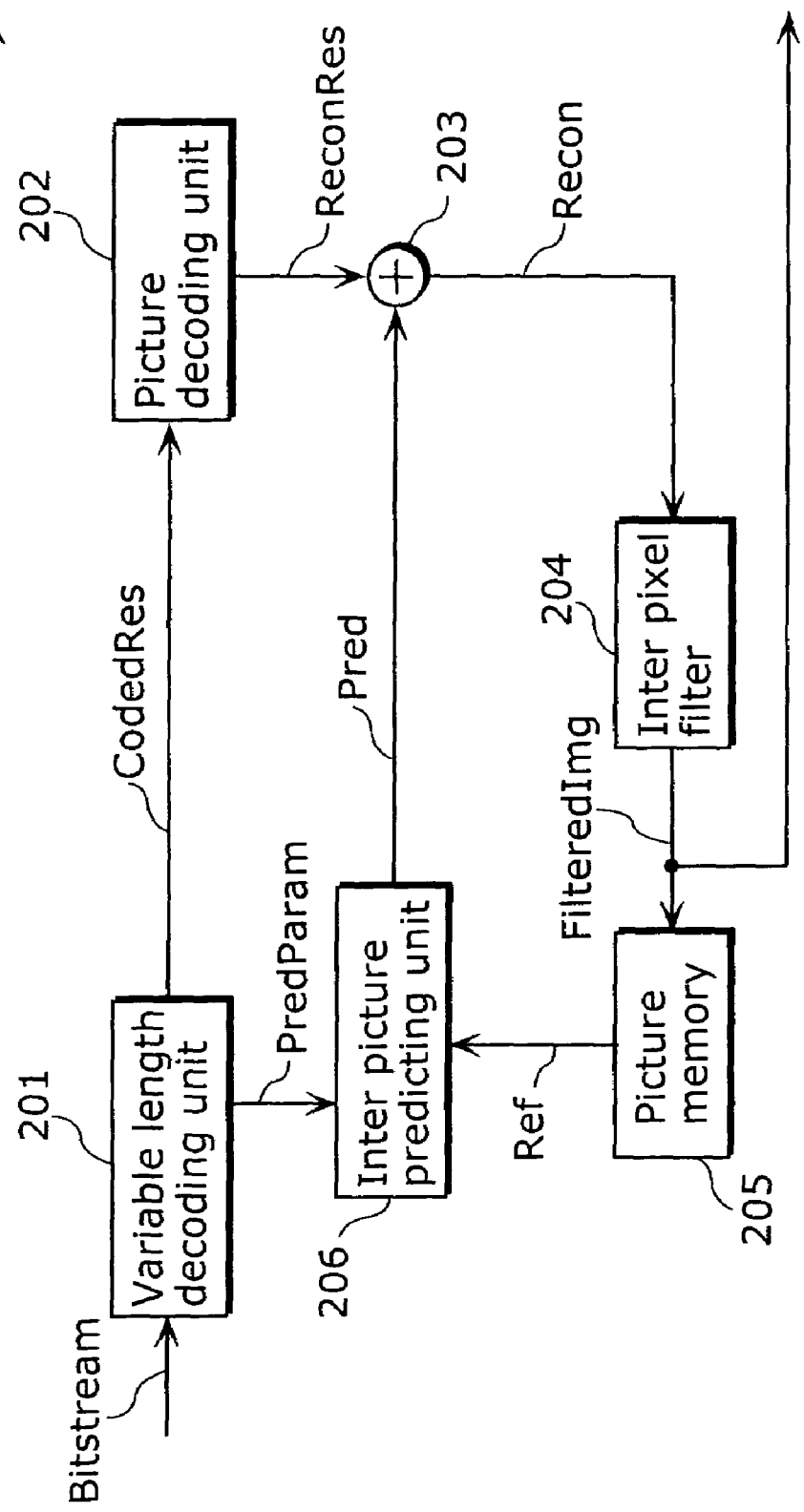
FIG. 2 is a block diagram showing the structure of a conventional picture decoding apparatus.
Figure 3:
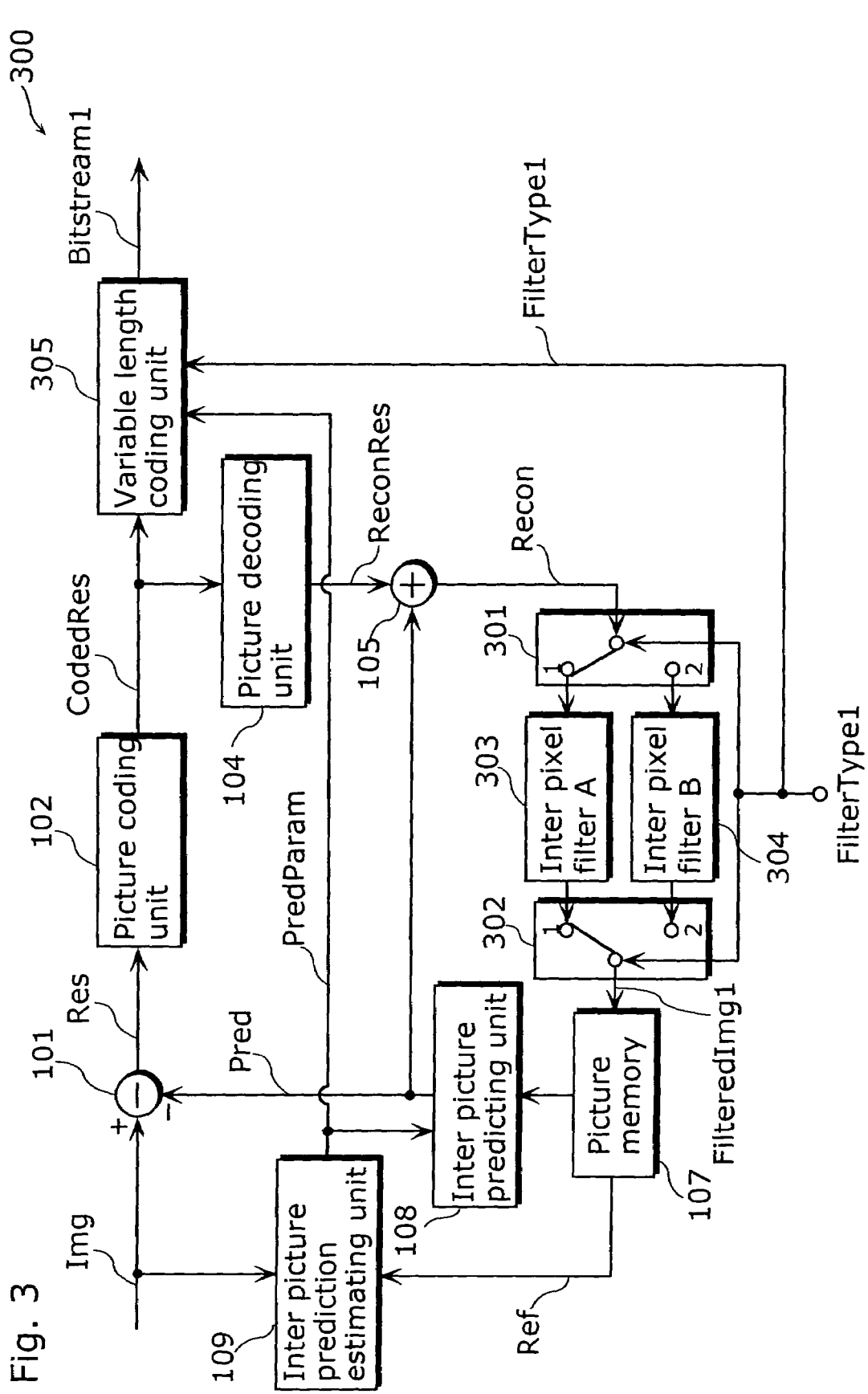
FIG. 3 is a block diagram showing the structure of a picture coding apparatus according to a first embodiment of the present invention.

The following explains concrete embodiments of the present invention with reference to the figures. FIG. 3 is a block diagram showing the structure of a picture coding apparatus 300 according to the first embodiment of the present invention. In this figure, the same reference numbers are assigned to the same constituent elements and data as those of the conventional picture coding apparatus 100 as shown in FIG. 1 and the explanations thereof are omitted, because they have been already explained. Similarly, in the following figures, the same reference numbers are assigned to the constituent elements and data which have been already explained, and the explanations thereof are omitted. The picture coding apparatus 300 is comprised of the difference calculator 101, the picture coding unit 102, a variable length coding unit 305, the picture decoding unit 104, the adder 105, the picture memory 107, the inter picture predicting unit 108, the inter picture prediction estimating unit 109, a switch 301, a switch 302, an inter pixel filter A 303 and an inter pixel filter B 304. The switch 301 and the switch 302 are switches for respectively connecting to either a terminal 1 or a terminal 2 selectively depending on a value of filter type information FilterType1. The switch 301 is provided between the output terminal of the adder 105 and the input terminals of the inter pixel filter A 303 and the inter pixel filter B 304. And the switch 302 is provided between the input terminal of the picture memory 107 and the output terminals of the inter pixel filter A 303 and the inter pixel filter B 304. The inter pixel filter A 303 and the inter pixel filter B 304 are deblock filters for smoothing high frequency noise in the vicinity of the boundary between blocks to remove block distortion, for example, and their smoothing levels are different. Also, their operation processing loads for smoothing are different according to the smoothing levels. Note that the constituent elements shown in this figure such as the switch 301 and the switch 302 may be implemented either as hardware or software. The same applies to other figures.

The variable length coding unit 305 performs variable length coding, for instance, Huffman coding of the inputted filter type information FilterType1, coded differential picture data CodedRes and predictive parameter data PredParam respectively, and put them together into one coded data Bitstream1 for outputting the coded data outside the picture coding apparatus 300.

The operation of the picture coding apparatus 300 structured as above, particularly a part of a new structure, will be explained in more detail by comparing with the conventional picture coding apparatus 100. First, the filter type information FilterType1 is inputted to the picture coding apparatus 300 from outside. Here, the input from outside means, for example, a user's input using a user interface such as a keyboard from outside a picture coding apparatus or data fixed for an apparatus, and a value which is determined by the apparatus depending on a bit rate (compression rate) or a picture size. This filter type information FilterType1 is inputted to the switch 301 and the switch 302. The switch 301 and the switch 302 switch connection to either the "terminal 1" or the "terminal 2" depending on the value of this filter type information FilterType1. For example, when the value of the filter type information FilterType1 is "1", both the switch 301 and the switch 302 connect to the terminal "1". In this case, filtering by the inter pixel filter A 303 is applied to the decoded picture data Recon outputted from the adder 105. When the value of the filter type information FilterType1 is "2", the switch 301 and the switch 302 switch to the terminal "2" side, and filtering by the inter pixel filter B 304 is applied to the decoded picture data Recon outputted from the adder 105. The filtered decoded picture data FilteredImg1 which is filtered by the inter pixel filter A 303 or the inter pixel filter B 304 is stored in the picture memory 107, and used as a reference picture for predictive coding of the following pictures. Also, the filter type information FilterType1 specifying an inter pixel filter is inputted to the variable length coding unit 305 together with the coded differential picture data CodedRes and the predictive parameter data PredParam of the same picture for performing variable length coding of these data respectively. The variable length coding result of the filter type information FilterType1 is stored in the coded data Bitstream1 by associating with the variable length coding results of these coded differential picture data CodedRes and predictive parameter data PredParam, and recorded on a recording medium or transmitted to a picture decoding apparatus. In other words, the type of the inter pixel filter applied to the decoded picture data Recon of each picture is notified to the picture decoding apparatus by the filter type information FilterType1 stored in the coded data Bitstream1. Therefore, since the picture decoding apparatus that decodes the coded data Bitstream1 can specify the inter pixel filter which is applied to the decoded picture data Recon of each picture in the picture coding apparatus 300, it can use the same filter for the decoded picture of each picture. Note that although the value of the filter type information FilterType1 is "1" or "2" in the above explanation, this is a value defined just for the sake of explanation, and any other values may be used if a plurality of filters can be discriminated by such values.

As described above, the picture coding apparatus 300, including a plurality of inter pixel filters with different predictive performance and processing load as inter pixel filters, can use them by switching them depending on the filter type information FilterType1 inputted from outside. There are following advantages in using the inter pixel filters with different predictive performance and processing load by switching them. First, for explanation, it is assumed that the inter pixel filter A 303 has less processing load than the inter pixel filter B 304, while the inter pixel filter B 304 has higher noise suppression effect than the inter pixel filter A 303 for improving predictive coding efficiency. As a picture decoding apparatus that decodes the coded data outputted from the picture coding apparatus 300 of the present invention, two types of picture decoding apparatus are assumed: a picture decoding apparatus A including only the inter pixel filter A 303; and a picture decoding apparatus B including both the inter pixel filter A 303 and the inter pixel filter B 304. The former picture decoding apparatus A, which is required of less processing load, is suitable for an apparatus with lower processing capability. The latter picture decoding apparatus B is suitable for an apparatus with higher processing capability. The latter picture decoding apparatus B can also decode the coded data obtained using either the inter pixel filter A 303 or the inter pixel filter B 304, and has upward compatibility with the former picture decoding apparatus A. In such a case, the picture coding apparatus 300 can function as a picture coding apparatus which supports both of these two types of picture decoding apparatuses. In other words, by structuring the picture coding apparatus 300 so as to select the inter pixel filter with appropriate predictive performance and processing load depending on the processing capability of the target picture decoding apparatus, the coding method using the same inter pixel filter as applied in the picture coding apparatus 300 can be applied to a wide variety of devices (to decode the coded data Bitstream1).

Also, the inter pixel filter can be switched depending on the processing capability of the picture coding apparatus 300 not only for generating the coded data depending on the processing capability of the picture decoding apparatus but for other uses. For example, if a picture size and a picture rate to be coded are large, processing load required for entire coding processing becomes large. Therefore, the inter pixel filter B 304 with high processing capability required is used when the picture size and the picture rate to be coded are fixed values or less, and the inter pixel filter A 303 with lower processing capability required is used when the picture size and the picture rate to be coded are fixed values or more, so as to suppress the processing load required for entire coding processing. Or, when picture coding is realized by a time sharing system in which one apparatus executes a plurality of processes by time sharing, there is a possibility that the processing load allocable to picture coding changes dynamically under the influence of other processes. So, when the processing load allocable to picture coding is a fixed value or more, the inter pixel filter B 304 with high processing load is used, while when the processing load allocable to picture coding is a fixed value or less, the inter pixel filter A 303 with less processing load than the inter pixel filter B 304 can be used.

As for timing of switching inter pixel filters, by providing a plurality of inter pixel filters suitable for pictures of specific properties, they may be switched on a picture-by-picture basis depending on the property of each picture. For example, when edge information is important such as in the case of characters, an inter pixel filter having a good edge preserving is used. They may be switched by automatic judgment utilizing picture processing techniques such as edge detection and character detection, or a user may select explicitly from among an inter pixel filter suitable for nature images, an inter pixel filter suitable for characters and an inter pixel filter suitable for edges. If a plurality of inter pixel filters can be switched in this manner, a filter suitable for picture properties can be selected, and thus predictive efficiency can be further improved. In other words, it is also effective to switch filters so as to improve picture quality, not to switch them depending on processing load. Therefore, in the present embodiment, switching of filters depending on processing load has been explained, but they may be switched so as to improve picture quality.

In addition, the unit of switching inter pixel filters is not limited to a picture-by-picture basis, but inter pixel filters may be switched in the unit of an image area smaller than a picture, such as a slice, a macroblock and a block of MPEG, or in the unit of an area including at least one pixel, because picture properties may vary in the part of the picture.

Figure 4:
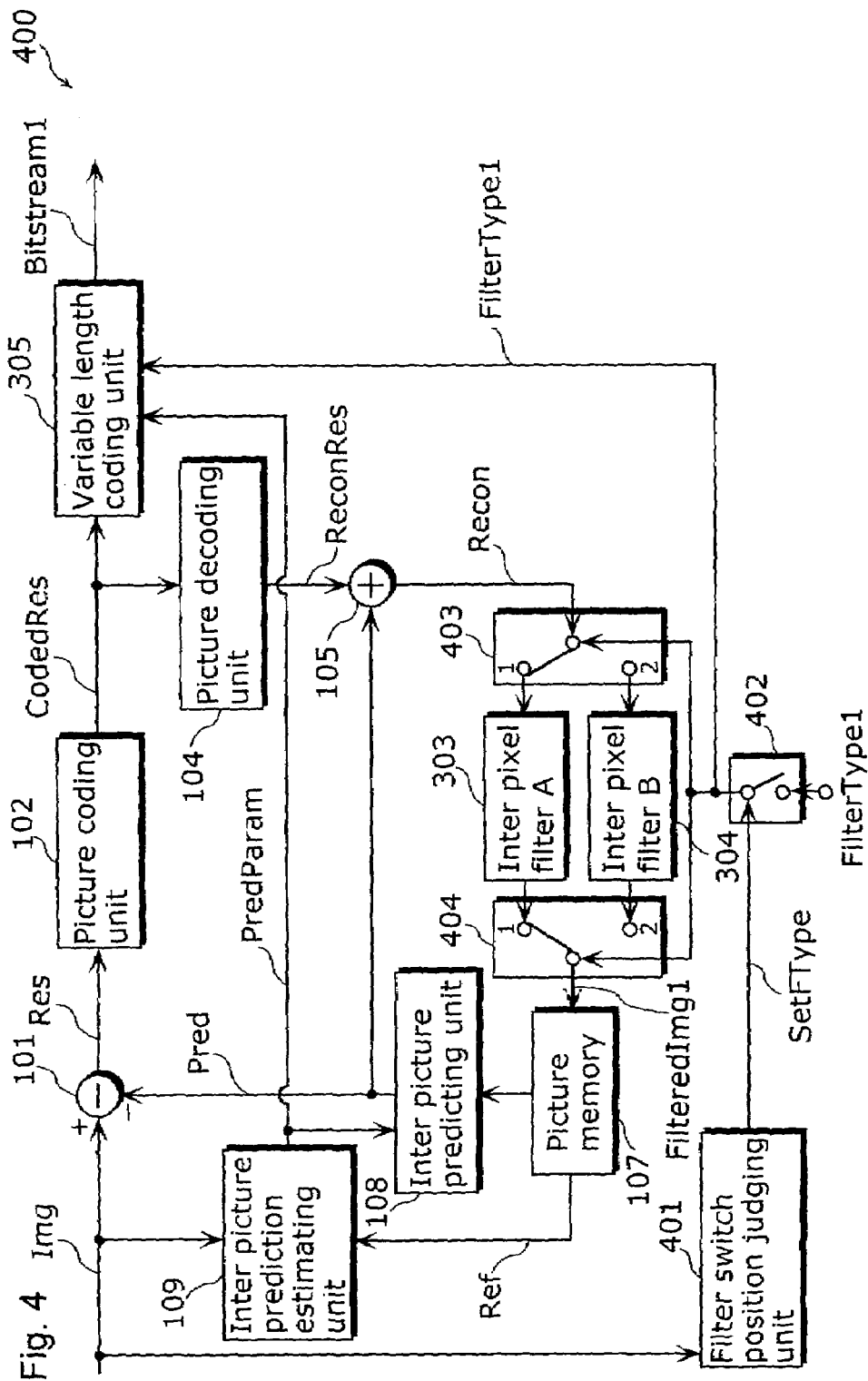
FIG. 4 is a block diagram showing the structure of a picture coding apparatus that switches an inter pixel filter for every slice of an input picture.

FIG. 4 is a block diagram showing the structure of a picture coding apparatus 400 that switches inter pixel filters by every slice of an input picture. The picture coding apparatus 400 is a picture coding apparatus that filters a decoded picture by switching inter pixel filters in the unit of a slice of MPEG, and is comprised of the difference calculator 101, the picture coding unit 102, the picture decoding unit 104, the adder 105, the picture memory 107, the inter picture predicting unit 108, the inter picture prediction estimating unit 109, a switch 403, a switch 404, the inter pixel filter A 303, the inter pixel filter B 304, the variable length coding unit 305, a filter switch position judging unit 401 and a switch 402. The filter switch position judging unit 401 detects slices of an input picture in picture data Img inputted from outside, and outputs to the switch 402 filter switch control data SetFType for outputting one pulse, for instance, at every switch of the detected slices. The switch 402 is a switch which is disconnected between terminals while the filter switch control data SetFType is not outputted, and brings the filter type information FilterType1 inputted from outside into conduction to the switch 403 and the switch 404 for a fleeting moment while the filter switch control data SetFType is being outputted. The switch 403 and the switch 404 respectively connect their terminals "1" or the terminals "2" depending on the value of the filter type information FilterType1 which is inputted instantly at every switch of the slices of the input picture data Img, and keeps the connection state. In other words, while the switch 402 is disconnected, the inter pixel filters are not switched. As a result, a new inter pixel filter is selected according to the filter type information FilterType1 at every switch of the slices of the input picture data Img, and thus the inter pixel filters can be prevented from being switched in the middle of the slice.

As explained above, according to the picture coding apparatus of the present invention, it becomes possible to create coded data using an inter pixel filter depending on the processing capability of a picture decoding apparatus that reproduces the coded data outputted from the picture coding apparatus of the present invention. Also, the inter pixel filter can be selected depending on the processing capability of the picture coding apparatus.

Note that although the picture coding apparatus in the present embodiment has two inter pixel filters, it may have three or more inter pixel filters. In the same manner as the present embodiment, any one of the three or more inter pixel filters is selected and used, and the filter type information indicating the type of the used inter pixel filter may be included in the coded data.

In addition, filters may be switched so as to improve picture quality, not be switched depending on processing load.

Note that in the picture coding apparatus 400, the filter switch control data SetFType is a pulse waveform indicating the value "1" at every switch of detected slices and "0" during the period other than the switching moment, but the present invention is not limited to such a case, and it may be a rectangular wave which is inverted at every switch of slices, for example, or any other waveforms. Also, the switch 402 is a switch which is disconnected between terminals while the filter switch control data SetFType is in the same phase, but the present invention is not limited to such a case, and the filter switch position judging unit 401 may output the filter switch control data SetFType indicating the value for disconnecting the switch 402 at the positions other than the filter switch position. In addition, in the picture coding apparatus 400, the inter pixel filters are switched on a slice-by-slice basis of the picture data Img, but the inter pixel filters may be switched on a picture-by-picture basis, or may be switched in the unit of a block, a macroblock or a fixed number of pixels.

FIG. 5A is a diagram showing the stream structure of coded data Bitstream outputted by the picture coding apparatus of the present invention. FIG. 5B is a diagram showing the stream structure of coded data Bitstream outputted when the picture coding apparatus of the present invention switches inter pixel filters in the unit of a slice. The feature of the coded data of the present invention is that the coded data Bitstream includes filter type information FilterType specifying one of a plurality of inter pixel filters. Thanks to this stream structure, the picture decoding apparatus of the present invention that decodes the coded data Bitstream can use the same inter pixel filter as that used for coding, by checking the filter type information FilterType included in the coded data Bitstream.

In the coded data Bitstream as shown in FIG. 5A, the value of the filter type information FilterType indicating the inter pixel filter used for filtering each picture is described in (a diagonally shaded area, for instance, of) the header 901 which is attached to the entire coded data Bitstream. This coded data Bitstream corresponds to the coded data Bitstream1 outputted from the picture coding apparatus 300 as shown in FIG. 3. Also, in the coded data Bitstream as shown in FIG. 5B, the value of the filter type information FilterType indicating the inter pixel filter used for filtering that slice is described in (a diagonally shaded area, for instance, of) the slice header 902 provided to each slice. This coded data Bitstream corresponds to the coded data Bitstream1 outputted from the picture coding apparatus 400 as shown in FIG. 4. As just described, by storing the filter type information FilterType in the header 901 at the head of the coded data Bitstream or the slice header 902 at the head of each slice that is not only the basic unit of recording and transmitting data but also the unit of correcting and modifying errors, the picture decoding apparatus can specify the filtering type of a slice before decoding the slice by receiving coded data Bitstream from the header 901 or the slice.

Note that it has been explained here that an inter pixel filter is switched in the unit of a slice, but it may be switched not only in the unit of a slice but also in the unit of an image area smaller than a slice (the unit may be an area including one or more pixels, such as a macroblock and a block of MPEG). Also, it may be switched picture by picture that is the unit of an image area larger than a slice. In this case, the value of the filter type information FilterType1 corresponding to each picture may be described not only in (a diagonally shaded area, for instance, of) the header 901 as shown in FIG. 5A but also in a picture header provided for each coded picture data, for example. In addition, when a filtering method is switched in the unit of a macroblock or a block, the value of the filter type information FilterType1 of each macroblock or block may be put together per slice and described in the slice header.

Furthermore, for transmitting the coded data in the form of packet or the like, the header and the data may be transmitted separately. In this case, the header and the data are not included in one bit stream as shown in FIG. 5. However, in the case of packet transmission, the header paired with the data is just transmitted in another packet even if the packets are transmitted somewhat out of sequence, and thus the concept is same as the case of the bit stream explained in FIG. 5 even if they are not transmitted as one bit stream.

As explained above, by setting the value of the filter type information FilterType1 inputted to the picture coding apparatus of the present invention so as to select an inter pixel filter depending on the processing capability of the picture decoding apparatus, it becomes possible to create coded data depending on the processing capability of the picture decoding apparatus that reproduces the coded data outputted by the picture coding apparatus of the present invention. Also, an inter pixel filter can be selected depending on the processing capability of the picture coding apparatus.

In addition, a filter may be switched so as to improve picture quality, not be switched depending on processing load.

FIG. 6 is a block diagram showing the structure of a picture decoding apparatus 1000 that decodes the coded data Bitstream1 generated by the picture coding apparatus according to the first embodiment. The picture decoding apparatus 1000 is a picture decoding apparatus that switches an inter pixel filter picture by picture or slice by slice according to the filter type information filterType1 described in the header of the inputted coded data Bitstream1 and decodes the coded data in the coded data Bitstream1, and is comprised of the variable length decoding unit 201, the picture decoding unit 202, the adder 203, the picture memory 205, the inter picture predicting unit 206, a switch 1001, a switch 1002, an inter pixel filter A 1003 and an inter pixel filter B 1004.

The coded data Bitstream1 is inputted to the picture decoding apparatus 1000 from outside. This coded data Bitstream1, for example, is the data coded by the picture coding apparatus 300 or the picture coding apparatus 400 in the first embodiment. The variable length decoding unit 201 performs variable length decoding of the inputted coded data Bitstream1, separates it into coded differential picture data CodedRes, predictive parameter data PredParam and filter type information FilterType1, and outputs the coded differential picture data CodedRes to the picture decoding unit 202, the predictive parameter data PredParam to the inter picture predicting unit 206, and the filter type information FilterType1 to the switch 1001 and the switch 1002, respectively. When the value "1" is inputted as the filter type information FilterType1, the switch 1001 and the switch 1002 change the connection to the terminal "1" side, and apply filtering by the inter pixel filter A 1003 to the decoded picture data Recon. When the value "2" is inputted as the filter type information FilterType1, the switch 1001 and the switch 1002 change the connection to the terminal "2" side, and apply filtering by the inter pixel filter B 1004 to the decoded picture data Recon. Regardless of whether an inter pixel filter operation is performed by either inter pixel filter, the filtered decoded picture data FilteredImg1 is stored in the picture memory 205 and outputted outside the picture decoding apparatus 1000, for instance, a display apparatus or the like.

As explained above, according to the picture decoding apparatus 1000 of the present invention, it becomes possible to decode the coded data Bitstream1 including the filter type information filterType1 specifying the type of the inter pixel filter in the header.

Note that although the picture decoding apparatus of the present embodiment includes two inter pixel filters, it may include three or more inter pixel filters. In this case, in the same manner as the present embodiment, one of three or more inter pixel filters may be selected according to the filter type information in the coded data Bitstream and used.

Note that as shown in the first embodiment, when the filter type is switched in the unit of a picture or the unit of an image area smaller than a picture, the inter pixel filter is switched at the time point when the filter type is changed.

FIG. 7 is a block diagram showing the structure of a picture decoding apparatus 1100 that uses a built-in inter pixel filter in place of a specified inter pixel filter if such a filter is not integrated. The picture decoding apparatus 1100 is characterized in that it uses any one of the inter pixel filters built in itself instead if the inter pixel filter selected by the filter type information included in the coded data is not built in itself. This picture decoding apparatus 1100 includes the variable length decoding unit 201, the picture decoding unit 202, the adder 203, the picture memory 205, the inter picture predicting unit 206, the switch 1001, the switch 1002, the inter pixel filter A 1003, the inter pixel filter B 1004 and a filter type information converting unit 1101.

For example, it is assumed that the picture decoding apparatus 1100 includes only two types of the inter pixel filter A 1003 and the inter pixel filter B 1004 indicated by the value "1" and the value "2" of the filter type information FilterType1. Coded data Bitstream3 is inputted to the picture decoding apparatus 1100 from outside. The variable length decoding unit 201 performs variable length decoding of the inputted coded data Bitstream3, separates it into coded differential picture data CodedRes, predictive parameter data PredParam and filter type information FilterType3, and outputs the coded differential picture data CodedRes to the picture decoding unit 202, the predictive parameter data PredParam to the inter picture predicting unit 206, and the filter type information FilterType3 to the filter type information converting unit 1101, respectively. When the value of the filter type information FilterType3 is the value "3" indicating an inter pixel filter not built in the picture decoding apparatus 1100, the filter type information converting unit 1101 converts the value "3" of the filter type information FilterType3 into the value "2" indicating the inter pixel filter whose smoothing level is most approximate to that of the specified inter pixel filter from among the inter pixel filters built in the picture decoding apparatus 1100, for example, and outputs it as filter type information FilterType4.

By performing this conversion processing, decoding processing to reconstruct a picture closely to the original decoded picture is possible although picture quality is degraded to some extent because an inter pixel filter different from that for coding is used in the picture decoding apparatus 1100, so there is enough availability as a simple picture decoding function. When the value "1" is inputted as the filter type information FilterType4, both the switch 1001 and the switch 1002 change the connection to the terminal "1" side, and apply the filtering by the inter pixel filter A 1003 to the decoded picture data Recon. When the value "2" is inputted as the filter type information FilterType4, both the switch 1001 and the switch 1002 change the connection to the terminal "2" side, and apply the filtering by the inter pixel filter B 1004 to the decoded picture data Recon. Filtered decoded picture data FilteredImg3 that is the processing result by the inter pixel filter is outputted to a display apparatus or the like outside the picture decoding apparatus 1100.

As explained above, according to the picture decoding apparatus 1100, even if the filter type information FilterType3 specifying an inter pixel filter which is not built in the picture decoding apparatus 1100 is included in the input coded data Bitstream3, it can be decoded using a built-in inter pixel filter instead. Therefore, coded data Bitstream can be decoded without degrading the picture quality substantially.

Note that when the picture decoding apparatus 1100 has one inter pixel filter (including the case of no inter pixel filter operation), decoding can be performed using that inter pixel filter forcedly.

Note that the picture decoding apparatus of the present embodiment is equipped with two inter pixel filters (the case of no inter pixel filter operation is counted as one filter), but the picture decoding apparatus equipped with three or more inter pixel filters can perform the same processing. In other words, the processing of storing the decoded picture data Recon in the picture memory 205 as it is without being performed of inter pixel filter operation may be included as one of the processing of the inter pixel filter.

Note that as shown in the first embodiment, if the filter type is switched in the unit of a picture or the unit of an image area smaller than a picture, an inter pixel filter is switched at the point of changing the filter type.

Figure 9:
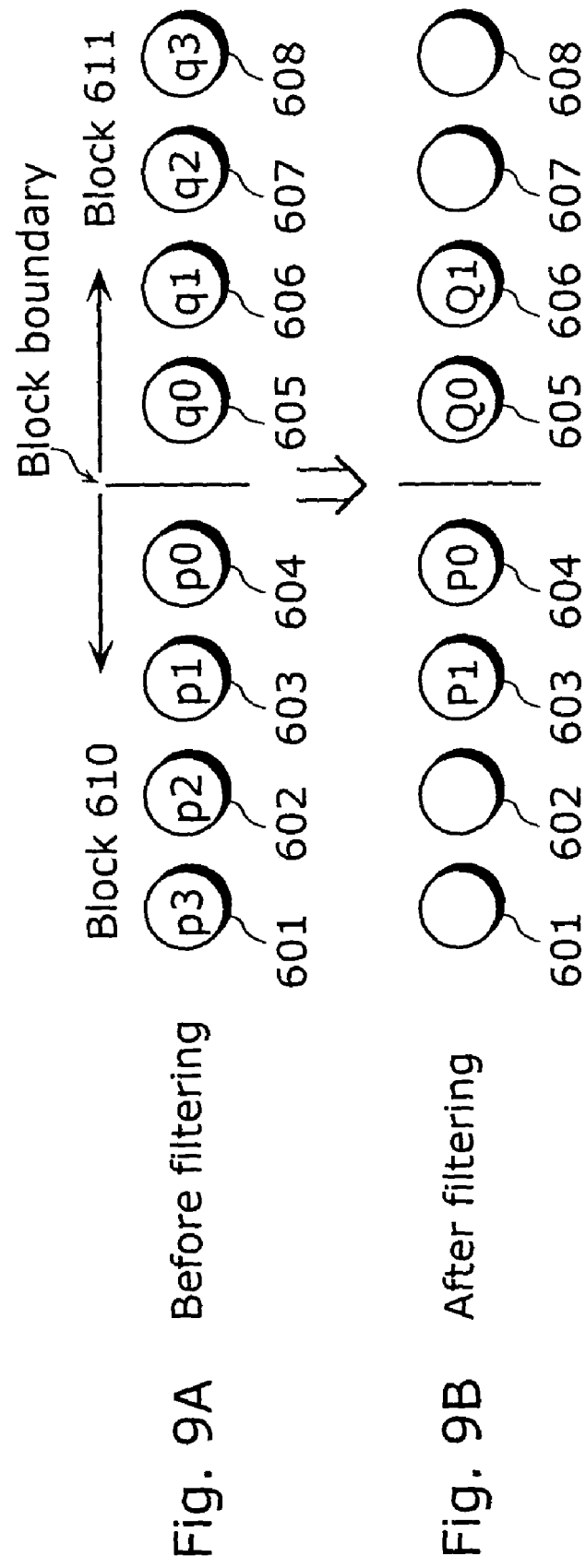
FIG. 9 is a diagram showing the details of operation by a deblock filter that is an example of the inter pixel filter as shown in FIG. 8. A is a diagram showing pixel values in the vicinity of the boundary between blocks before filtering. B is a diagram showing pixel values in the vicinity of the boundary between blocks after filtering.
Figure 10:
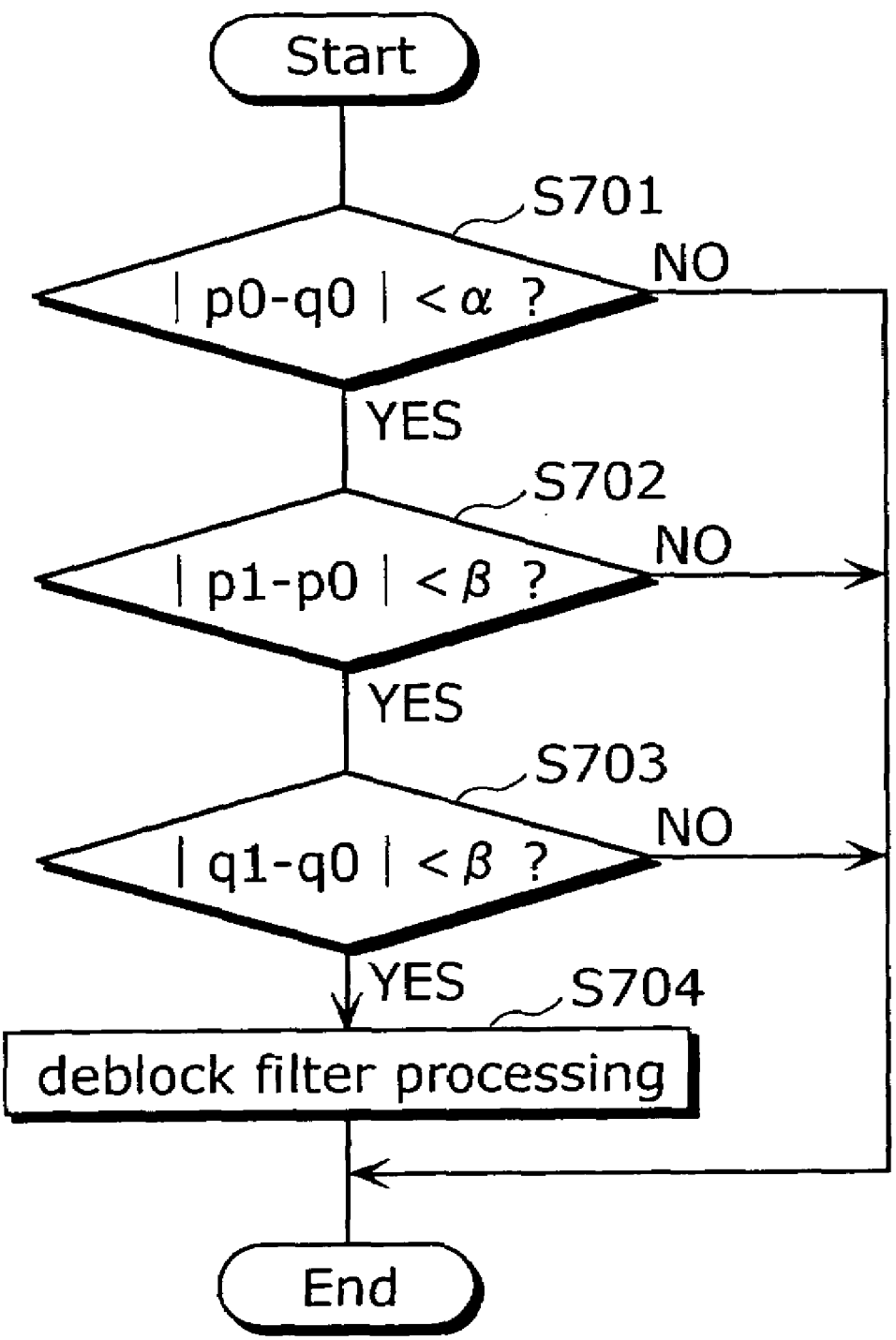
FIG. 10 is a flowchart showing a flow of filtering processing by an inter pixel filter.

The operation of the inter pixel filters 303, 304, 1003 and 1004 will be explained in more detail using FIG. 9 and FIG. 10. FIG. 9 is a diagram showing the operation details of a deblock filter that is an example of an inter pixel filter. FIG. 9A is a diagram showing pixel values in the vicinity of the boundary between blocks before filtering. FIG. 9B is a diagram showing pixel values in the vicinity of the boundary between blocks after filtering. FIG. 10 is a flowchart showing a flow of filtering processing by an inter pixel filter. FIG. 9A shows pixel values of respective pixels 601~608 on one horizontal scanning line. The pixels 601~604 are all pixels in a block 610, but the pixels 605~608 are pixels in a block 611 adjacent to the block 610. The pixel values of the pixels 601~604 are respectively p3, p2, p1 and p0, and the pixel values of the pixels 605~608 are respectively q0, q1, q2 and q3. In a picture coding apparatus, processing such as inter picture prediction, picture coding, variable length coding and picture decoding is generally performed in the unit of a block (or macroblock). Therefore, coding noise is apt to appear in the higher frequencies between pixels, such as the pixel 604 and the pixel 605, across the boundary between adjacent blocks (or macroblocks), such as the block 610 and the block 611. For example, there is a tendency that the difference between the pixel value p0 of the pixel 604 and the pixel value q0 of the pixel 605 is apt to increase due to the influence of the coding noise. Therefore, an inter pixel filter is a filter that can be determined using a plurality of parameters, for example, a filter corresponding to parameters $\alpha$ and $\beta$ for determining the filter, and pixel values of a group of pixels across the block boundary are filtered by this inter pixel filter.

As shown in FIG. 10, an inter pixel filter first calculates the absolute value of the difference of the pixel values (p0−q0) between the pixel 604 and the pixel 605 across the boundary, and judges whether the calculated absolute value is less than the value of the parameter $\alpha$ or not (S701). As a result of the judgment, if the absolute value of the difference (p0−q0) between the pixel values is the value of the parameter $\alpha$ or more, the inter pixel filter does not perform deblock filter processing for the pixel value represented by the decoded picture data Recon (S704). On the other hand, as a result of the judgment in Step S701, if the absolute value of the difference (p0–q0) between the values of adjacent pixels across the block boundary is less than the value of the parameter α, the inter pixel filter further calculates the absolute value of the difference (p1–p0) between the values of the pixel 604 and the pixel 603, and judges whether the calculated absolute value is less than the value of the parameter β or not (S702). Here, the pixel 604 and the pixel 603 are adjacent pixels in one block 610. As a result of the judgment, if the absolute value of the difference (p1–p0) between the pixel values is the value of the parameter β or more, the inter pixel filter 503 does not perform deblock filter processing for the pixel value represented by the decoded picture data Recon (S704). Also, as a result of the judgment, if the absolute value of the difference (p1–p0) between the pixel values is less than the value of the parameter β, it further calculates the absolute value of the difference (q1–q0) between the pixel 605 and the pixel 606, and judges whether the calculated absolute value is less than the value of the parameter β or not (S703). Here, the pixel 605 and the pixel 606 are adjacent pixels in one block 611. As a result of the judgment, if the absolute value of the difference (q1–q0) of the pixel values is the value of the parameter β or more, the inter pixel filter does not perform deblock filter processing for the pixel value represented by the decoded picture data Recon (S704). On the other hand, if the absolute value of the difference (q1–q0) between the pixel values is less than the value of the parameter β, the inter pixel filter 503 performs filtering for the decoded picture data Recon to remove coding noise, and ends the processing. The inter pixel filter repeats the above-mentioned processing for every pixel array in the horizontal scanning line direction and vertical scanning line direction respectively across the block boundaries. In this manner, by performing deblock filter processing when any one of the differences of values of three sets of adjacent pixels is less than a fixed value, block distortion is removed.

Note that in the deblock filter processing in the above Step S704, smoothing filtering (filtering for suppressing high frequency components) is performed for the pixels in the vicinity of the boundary. For example, a new pixel value P0 of the pixel 604 can be generated by smoothing, using a low pass filter for suppressing high frequency components for the pixel value p0 of the pixel 604, the pixel value q0 of the pixel 605, the pixel value p1 of the pixel 603 and the pixel value q1 of the pixel 606.

SECOND EMBODIMENT

Figure 8:
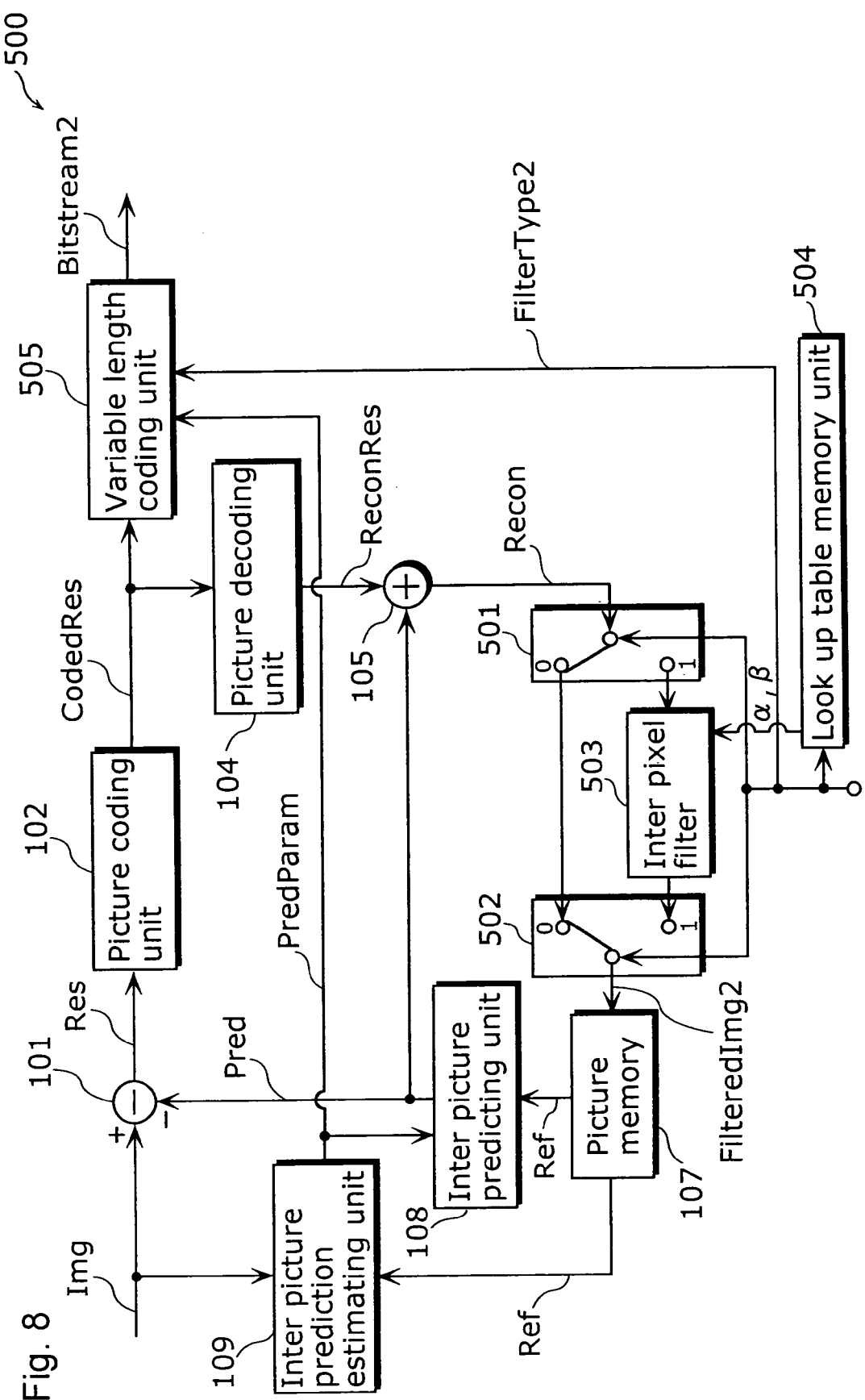
FIG. 8 is a block diagram showing the structure of a picture coding apparatus according to a second embodiment of the present invention.

FIG. 8 is a block diagram showing the structure of a picture coding apparatus 500 according to the second embodiment. The picture coding apparatus 500 is different from the picture coding apparatus 300 in that as inter pixel filter processing, the former can select whether or not storing the decoded picture data Recon in the picture memory 107 as it is as reference picture data Ref. The picture coding apparatus 500 is comprised of the difference calculator 101, the picture coding unit 102, the picture decoding unit 104, the adder 105, the picture memory 107, the inter picture predicting unit 108, the inter picture prediction estimating unit 109, a switch 501, a switch 502, an inter pixel filter 503, a look up table memory unit 504, and a variable length coding unit 505.

When the value of the filter type information FilterType2 is "0", both the switch 501 and the switch 502 change the connection to the terminal "0" side to store the decoded picture data Recon outputted from the adder 105 as it is in the picture memory 107. When the value of the filter type information FilterType2 is "1", both the switch 501 and the switch 502 change the connection to the terminal "1" side to bring the decoded picture data Recon outputted from the adder 105 to conduct to the inter pixel filter 503. The inter pixel filter 503 is a filter used for filtering pixel values and, for example, a deblock filter for suppressing coding noise in the higher frequency components on the block boundary. The filtered decoded picture data FilteredImg2 which is performed of inter pixel filter operation by the inter pixel filter 503 is stored in the picture memory 107. The variable length coding unit 505 performs variable length coding of this filter type information FilterType2, the coded differential picture data CodedRes and the predictive parameter data PredParam, puts them together into one coded data Bitstream2 as shown in FIG. 5A, and outputs it outside the picture coding apparatus 500.

Note that the picture coding apparatus 500 has one inter pixel filter, but it may have two or more inter pixel filters. It may select any one of the two or more inter pixel filters or no inter pixel filter operation to use it, and include the filter type information indicating the type of the used inter pixel filter (including no inter pixel filter operation) into the coded data. Also, the picture coding apparatus 500 may omit the look up table memory unit 504, and instead have the function of the look up table memory unit 504 in the inter pixel filter 503.

As explained above, in the picture coding apparatus 500 of the present invention, it becomes possible to create coded data using an inter pixel filter depending on the processing capability of the picture decoding apparatus for reproducing the coded data Bitstream2 outputted from that picture coding apparatus 500. Also, an inter pixel filter can be selected depending on the processing capability of the picture coding apparatus 500. Also, the filter type may be switched in the unit of a picture or the unit of an image area smaller than a picture.

Figure 11:
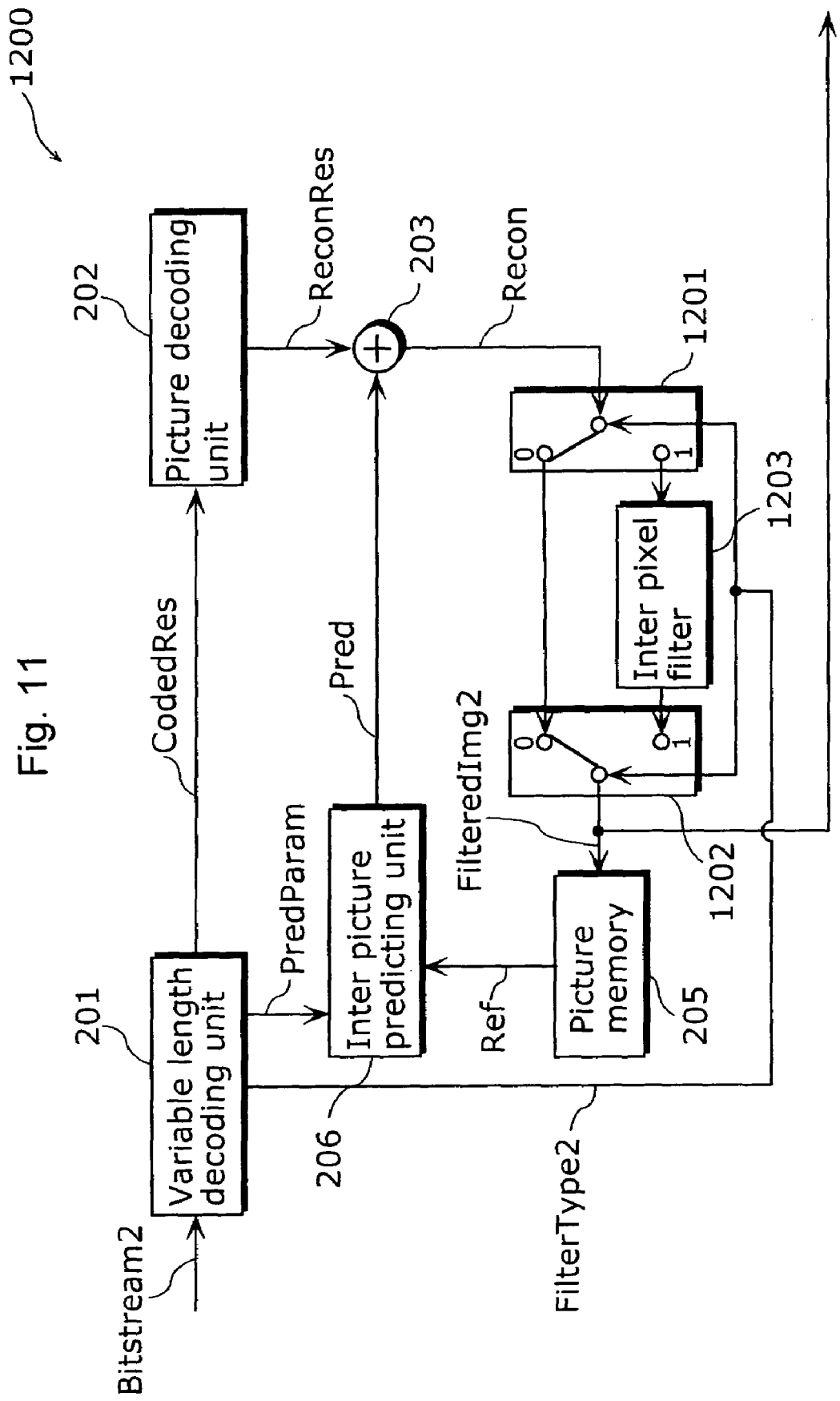
FIG. 11 is a block diagram showing the structure of a picture decoding apparatus that can select whether inter pixel filter processing is to be performed or not.

FIG. 11 is a block diagram showing the structure of a picture decoding apparatus 1200 according to the second embodiment that can select whether inter pixel filter processing is to be performed or not. The picture decoding apparatus 1200 is different from the picture decoding apparatus 1000 in FIG. 6 in that the former does not perform inter pixel filter operation as inter pixel filter processing, but can select storing the decoded picture data Recon as it is in the picture memory 205 as reference picture data Ref. The picture decoding apparatus 1200 is comprised of the variable length decoding unit 201, the picture decoding unit 202, the adder 203, the picture memory 205, the inter picture predicting unit 206, a switch 1201, a switch 1202 and an inter pixel filter 1203.

The coded data Bitstream2 whose header includes the filter type information FilterType2 indicating the inter pixel filter applied to the coding, for example, the coded data in FIG. 9A which is coded by the picture coding apparatus 500 in FIG. 8, is inputted to the picture decoding apparatus 1200. The filter type information FilterType2 includes the value indicating "no inter pixel filter operation" as a filter type. The variable length decoding unit 201 performs variable length decoding of the inputted coded data Bitstream2, and separates it into coded differential picture data CodedRes, predictive parameter data PredParam and filter type information FilterType2. The separated coded differential picture data CodedRes, predictive parameter data PredParam and filter type information FilterType2 are respectively outputted to the picture decoding unit 202, the inter picture predicting unit 206, and the switch 1201 and the switch 1202.

When the value "0" is inputted as the filter type information FilterType2, the switch 1201 and the switch 1202 both change the connection to the terminal "0" side, and the decoded picture data Recon outputted from the adder 203 is stored as it is in the picture memory 205. When the value "1" is inputted as the filter type information FilterType2, the switch 1201 and the switch 1202 both change the connection to the terminal "1" side to apply the filtering by the inter pixel filter 1203 to the decoded picture data Recon.

Figure 12:
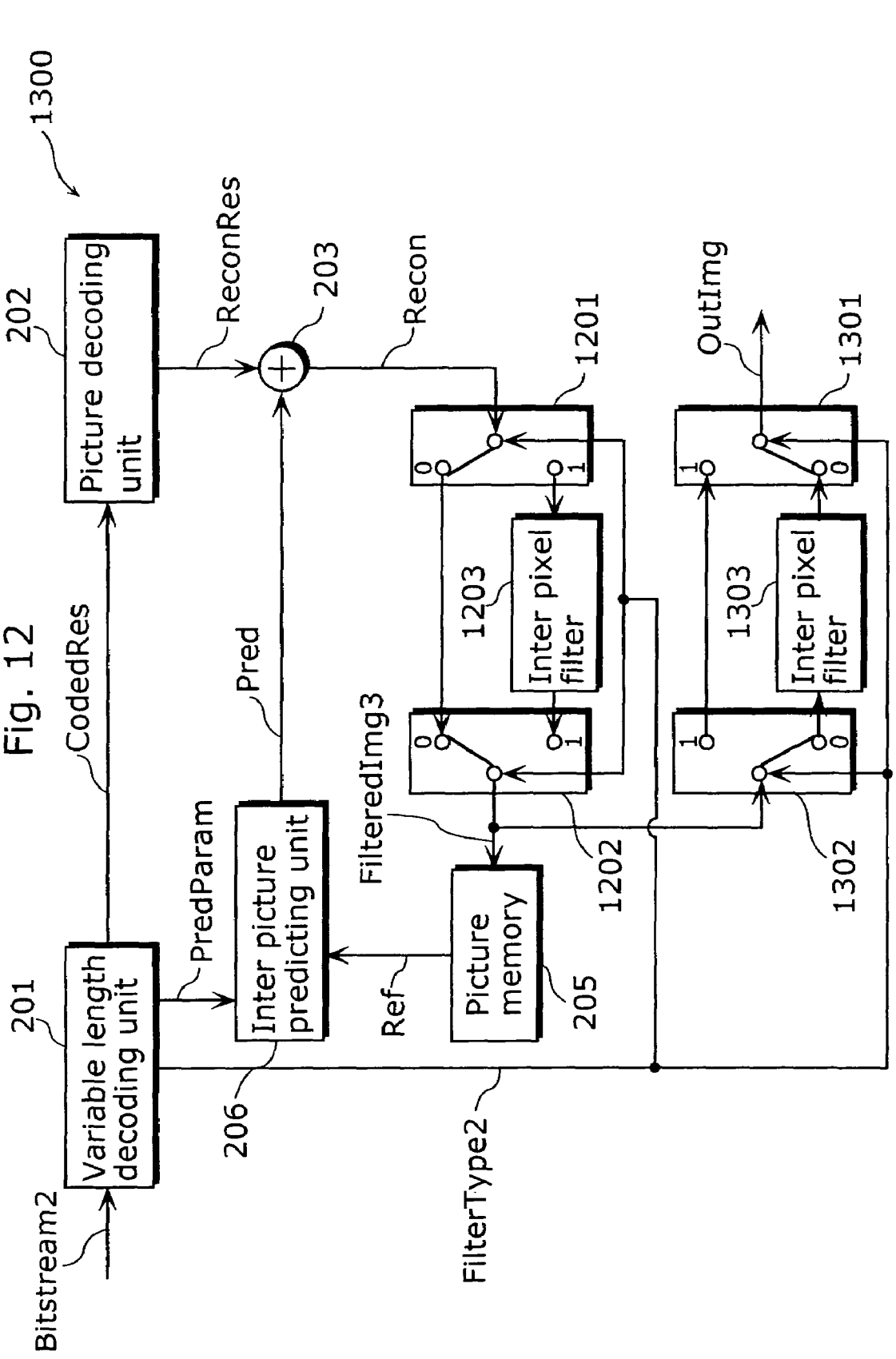
FIG. 12 is a block diagram showing the structure of a picture decoding apparatus which is equipped with an inter pixel filter that can further select in an output stage.

Also, if it is judged from the filter type information that an inter pixel filter is not used for a decoded picture which is to be a reference picture, the decoded picture is not filtered by the inter pixel filter for storing that picture in the picture memory as a reference picture, but the inter pixel filter may be used only for outputting it outside a picture decoding apparatus. FIG. 12 is a block diagram showing the structure of a picture decoding apparatus 1300 including a picture output unit equipped with selectable inter pixel filters. As explained above, the picture decoding apparatus 1300 is a picture decoding apparatus that, when the filter type information filterType2 indicates that the decoded picture outputted from the adder 203 is not filtered by an inter pixel filter, does not perform filtering of the decoded picture stored in the picture memory but performs filtering of the decoded picture outputted outside using an inter pixel filter provided at the output side, and is comprised of the variable length decoding unit 201, the picture decoding unit 202, the adder 203, the picture memory 205, the inter picture predicting unit 206, the switch 1201, the switch 1202, the inter pixel filter 1203, a switch 1301, a switch 1302 and an inter pixel filter 1303.

When the value of the filter type information FilterType2 is "1", the switch 1201, the switch 1202, the switch 1301 and the switch 1302 all change the connection to the terminal "1" side. In this case, the switch 1201 and the switch 1202 connect the output of the adder 203, the inter pixel filter 1203 and the picture memory 205, and the switch 1302 interrupts the connection with the output of the switch 1202 and the inter pixel filter 1303 to short-circuit with the switch 1301. Therefore, the inter pixel filter 1203 performs filter operation for the decoded picture data Recon and outputs the filtered decoded picture data FilteredImg3. The filtered decoded picture data FilteredImg3 is outputted as an output picture OutImg to a display apparatus or the like outside the picture decoding apparatus as it is, that is, without being filtered again by the inter pixel filter 1303. When the value of the filter type information FilterType2 is "0", the switch 1201, the switch 1202, the switch 1301 and the switch 1302 all change the connection to the terminal "0" side. In this case, the switch 1201 interrupts the connection with the output of the adder 203 and the inter pixel filter 1203 to short-circuit with the switch 1202. On the other hand, the switch 1302 connects the output of the switch 1202, the inter pixel filter 1303 and the external output terminal of the switch 1301. Therefore, the decoded picture data Recon outputted from the adder 203 is not performed of the inter pixel filter operation by the inter pixel filter 1203, but stored as it is in the picture memory 205 as a reference picture. The decoded picture data Recon which is taken out of the output side of the switch 1202, that is, the filtered decoded picture data FilteredImg3 which has not filtered actually is performed of the inter pixel filter operation by the inter pixel filter 1303, and outputted as an output picture OutImg to a display apparatus or the like outside the picture decoding apparatus 1300.

Note that the inter pixel filter 1203 and the inter pixel filter 1303 are described here as different constituent elements for explanation, but one inter pixel filter may be used for implementation (there is no problem to use one inter pixel filter because two inter pixel filters do not operate at the same time). Also, the inter pixel filter 1203 and the inter pixel filter 1303 may be the existing inter pixel filter 106, or the inter pixel filter 503 including the look up table memory unit 504 as shown in FIG. 8. Furthermore, it may be the inter pixel filter 503 including the look up table memory unit 504 for holding a plurality of parameter tables 620. However, in this case, the filter type information FilterType2' needs to be inputted to the inter pixel filter 503 also.

As explained above, according to the picture decoding apparatus 1300, even in the case where filtering is not performed for a decoded picture which is to be a reference picture, filtering by an inter pixel filter can be performed for the decoded picture, so a display apparatus for displaying an output picture OutImg outputted from the picture decoding apparatus 1300 can display moving pictures with higher picture quality. This is particularly effective for devices with enough processing capability when filtering is not performed for a decoded picture which is to be a reference picture.

Note that, as shown in the first embodiment, when the type of an inter pixel filter indicated by the filter type information FilterType2 is switched in the unit of a picture or in the unit of an image area smaller than a picture, the inter pixel filter is switched at the time of changing the filter type.

Figure 13:
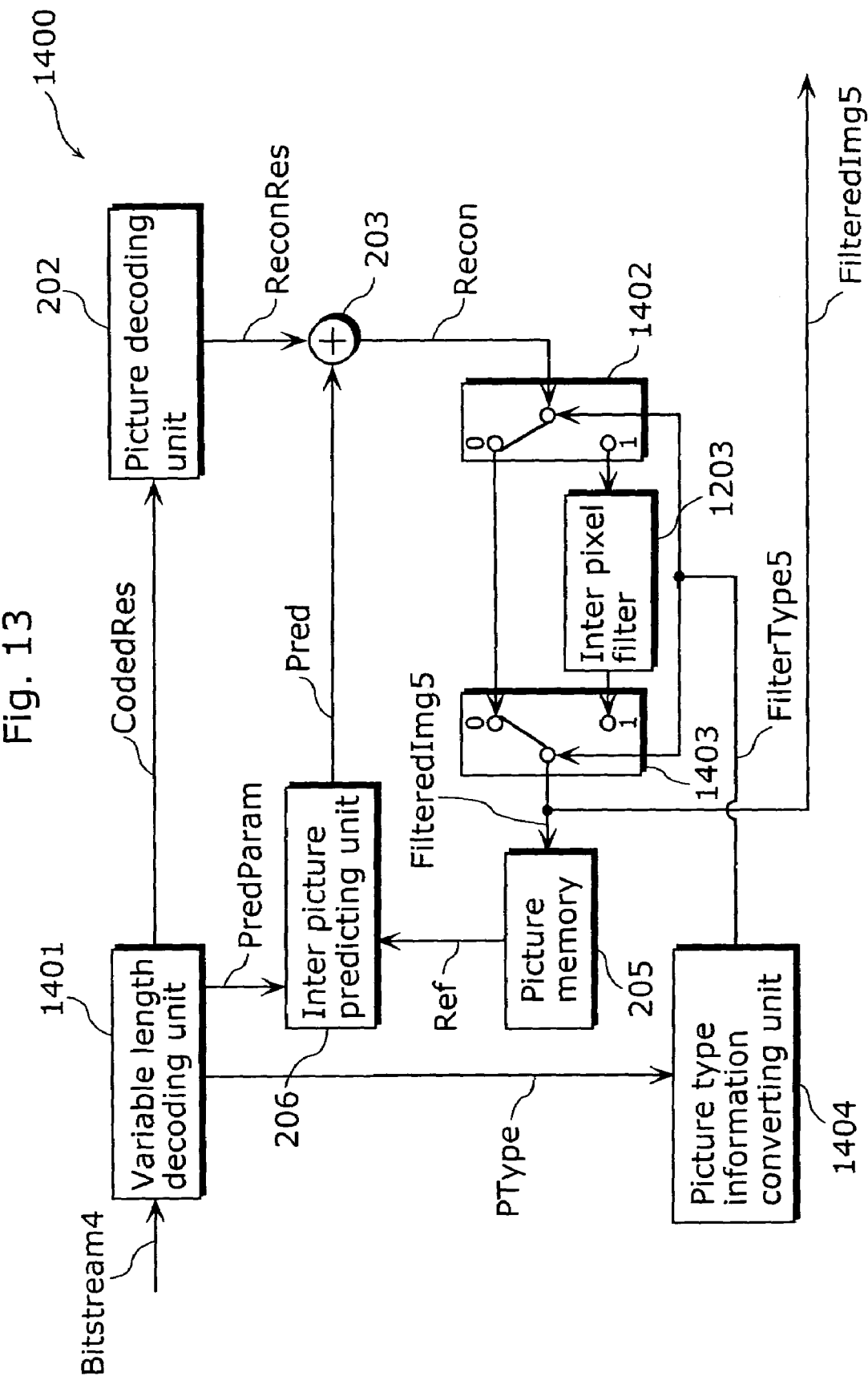
FIG. 13 is a block diagram showing the structure of a picture decoding apparatus that can select an inter pixel filter depending on a picture type of each picture.

FIG. 13 is a block diagram showing the structure of a picture decoding apparatus 1400 capable of selecting the inter pixel filter 1203 depending on a picture type of each picture. The picture decoding apparatus 1400 is a picture decoding apparatus that decodes information on whether a decoded picture is used as a reference picture or not, for example, coded data including a picture type of each picture and the like, and is comprised of the picture decoding unit 202, the adder 203, the picture memory 205, the inter picture predicting unit 206, the inter pixel filter 1203, a variable length decoding unit 1401, a switch 1402, a switch 1403 and a picture type information converting unit 1404.

The variable length decoding unit 1401 performs variable length decoding of coded data Bitstream4 inputted from outside, and separate it into picture type information PType, coded differential picture data CodedRes and predictive parameter data PredParam. The separated picture type information PType, coded differential picture data CodedRes and predictive parameter data PredParam are outputted respectively to the picture type information converting unit 1404, the picture decoding unit 202 and the inter picture predicting unit 206. The picture type information Ptype is the information indicating whether a current picture is used as a reference picture or not. For example, according to international standards, MPEG-1 and 2, information called a picture type is included in coded data of every picture, and a picture called a B-picture is not used as a reference picture. Therefore, this picture type included in the coded data may be used as the picture type information PType of the present embodiment. Even if filtering by means of an inter pixel filter is not performed for a picture which is not used as a reference picture, it does not have so serious influence on decoding of other pictures.

Here, the picture decoding apparatus 1400 does not perform inter pixel filtering if the current picture is not used as a reference picture. For example, when the processing capability of the picture decoding apparatus 1400 is too low to execute decoding in time for reproduction time, the processing load on the picture decoding apparatus 1400 can be reduced by not performing filtering by means of an inter pixel filter for pictures which are not used as reference pictures. It will be explained using the block diagram of FIG. 13. First, if the picture type information Ptype inputted to the picture type information converting unit 1404 indicates a picture other than a B-picture, that is, if it indicates that the current picture is used as a reference picture, both the switch 1402 and the switch 1403 change the connection to the terminal "1. Thereby, the picture decoding apparatus 1400 performs inter pixel filter operation for the decoded picture data Recon using the inter pixel filter 1203, and stores the operation result in the picture memory 205 as filtered decoded picture data FilteredImg5 and outputs it to a display apparatus or the like outside the picture decoding apparatus 1400. On the other hand, if the picture type information Ptype indicates that the current picture is a B-picture, that is, it indicates the current picture is not used as a reference picture, the switch 1402 and the switch 1403 change the connection to the terminal "0", and the decoded picture data Recon outputted from the adder 105 is outputted directly to outside without using the inter pixel filter 1203.

As mentioned above, since the picture decoding apparatus 1400 omits filtering by means of the inter pixel filter 1203 for a B-picture which is hardly referred to by other pictures, processing load required for decoding coded data Bitstream can be reduced without giving a great influence on decoding of other pictures. Also, since the picture decoding apparatus 1400 selects an inter pixel filter depending on a picture type of coded data in this manner, filtering processing load can be reduced even for coded data outputted from a conventional picture coding apparatus, with its header information such as a picture header not including selection information of an inter pixel filter, because filtering processing is omitted for pictures which are not referred to.

Note that it is not necessary to store pictures which are not referred to in the picture memory 205 in FIG. 13, for example, regardless of whether filtering processing is performed for the pictures or not. Therefore, it is necessary to store, in the picture memory 205, only data obtained by performing filtering processing for pictures which are referred to.

Note that, in the strict sense, a B-picture does not mean a picture which is not referred to, but a picture coding method in which a B-picture is referred to can be conceived. Therefore, if an inter pixel filter is not selected just depending on a picture type, but it is judged whether the picture is actually referred to or not, more appropriate processing can be performed even when a B-picture is referred to. However, even when a B-picture is referred to, an inter pixel filter may be switched just depending on a picture type for simplifying the implementation.

Also, whether inter pixel filtering is to be performed or not is not switched, but two filters, the inter pixel filter 1003 and the inter pixel filter 1004 may be switched depending on a picture type or whether a picture is referred to or not, as shown in FIG. 6 or FIG. 7.

Furthermore, an example of a picture decoding apparatus that switches an inter pixel filter depending on a picture type and whether a picture is referred to or not has been explained, but a picture coding apparatus can also perform this switching in the same manner.

THIRD EMBODIMENT

Figure 14:
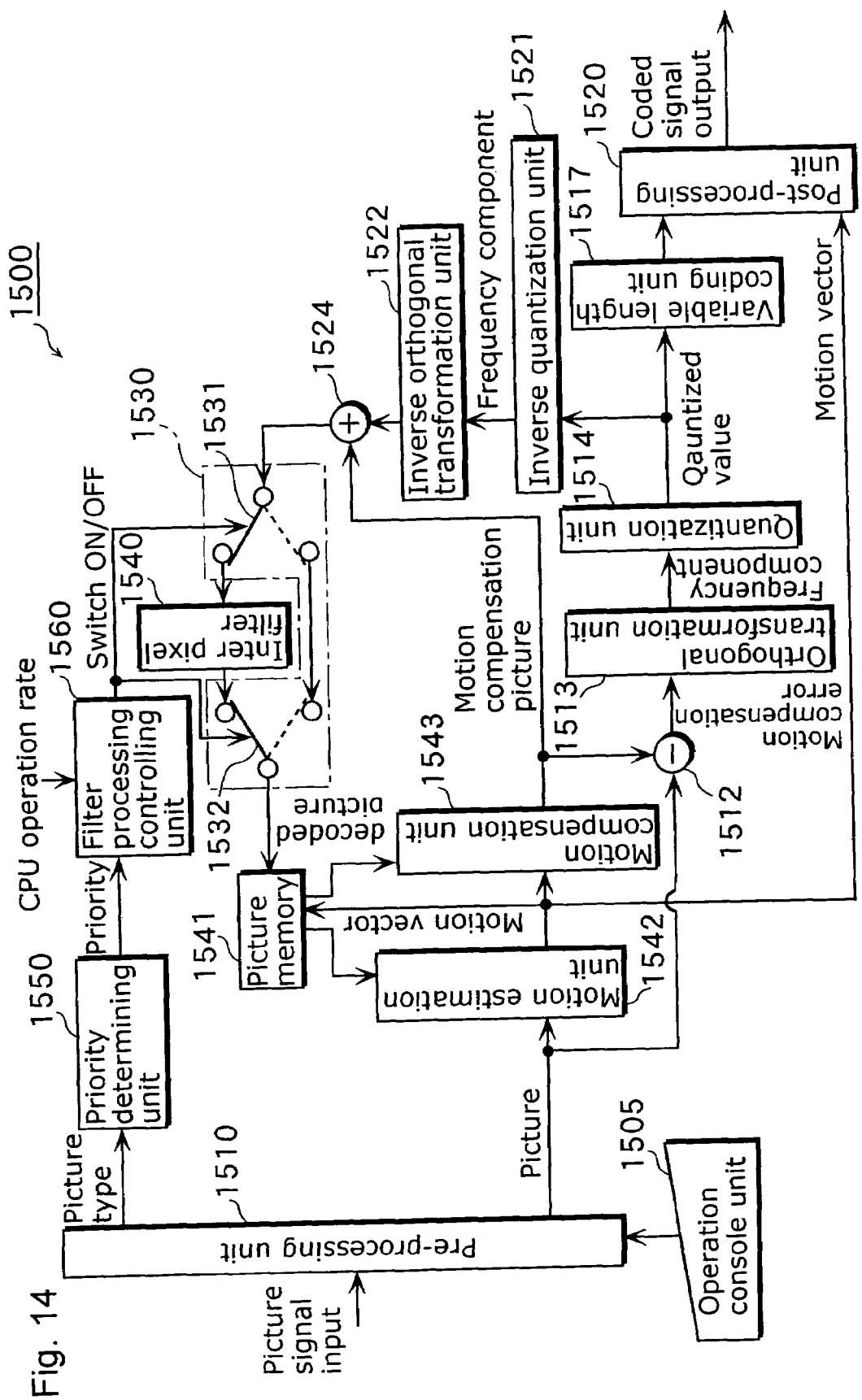
FIG. 14 is a block diagram showing the functional structure of a picture coding apparatus according to a third embodiment of the present invention.

FIG. 14 is a block diagram showing the functional structure of a picture coding apparatus 1500 according to the third embodiment of the present invention. The picture coding apparatus 1500 is realized by a computer apparatus equipped with a CPU, a memory, a hard disk (HD) on which a program for picture coding is installed and others, and has, as functions for that, an operation console unit 1505, a pre-processing unit 1510, a subtracting unit 1512, an orthogonal transformation unit 1513, a quantization unit 1514, a variable length coding unit 1517, a post-processing unit 1520, an inverse quantization unit 1521, an inverse orthogonal transformation unit 1522, an adding unit 1524, a switching unit 1530, an inter pixel filter 1540, a picture memory 1541, a motion estimation unit 1542, a motion compensation unit 1543, a priority determining unit 1550 and a filter processing controlling unit 1560.

The operation console unit 1505 accepts an operator's entry operation. The pre-processing unit 1510 is equipped with a format converting unit for converting a format of an inputted picture signal into a space resolution designated by the operation on the operation console unit 1505, a picture reordering unit for reordering pictures in accordance with picture types and others, and outputs pictures or the like in sequence.

Note that there are the following types of pictures: an I-picture (Intra Picture: intra coded picture) which is created in the intra picture coding mode; a P-picture (Predictive Picture: predictive coded picture) which is created in the inter picture coding mode and refers to only one picture; and a B-picture (Bi Predictive Picture: plural predictive picture) which can also refer to a backward picture, and at the time of motion estimation in the inter picture coding mode, the number of decoded pictures, stored in the picture memory 1541, which can be referred to at the same time by the motion estimation unit 1542, is restricted.

Also, in coding a picture, there are a mode for coding it using three types of pictures (hereinafter also referred to as an "IPB coding mode") and a mode for coding it using only two types of pictures, an I-picture and a P-picture. As the mode for coding it using only two types of pictures, an I-picture and a P-picture, there are a mode for coding a P-picture which has a possibility of being referred to and a P-picture which has no possibility of being referred to (hereinafter also referred to as a "first IP coding mode") and a mode for coding a P-picture in the base layer in layered coding, a P-picture which has a possibility of being referred to and a P-picture which has no possibility of being referred to in the enhancement layer (hereinafter also referred to as a "second IP coding mode"). In layered coding, pictures are classified into two groups, a base layer and an enhancement layer, and the base layer is a group of pictures which can be reproduced by themselves and the enhancement layer is a group of pictures which require the group of pictures on the base line for coding and decoding. The layered coding is characterized in that, since the number of bits only for the base layer is small but the number of bits for both the base layer and the enhancement layer is large and the number of pictures is large, two types of uses can be easily realized by recording and transmitting the base line in all cases and recording and transmitting the enhancement layer only when necessary for high picture quality.

In the case of the first IP coding mode, information of "possibility" or "no possibility" is added to a picture and information of "possibility" or "no possibility" is added to a picture type as well. Also, in the case of the second IP coding mode, information of "base", "possibility" or "no possibility" is added to a picture and information of "base", "possibility" or "no possibility" is added to a picture type as well.

The subtracting unit 1512 outputs the picture outputted from the pre-processing unit 1510 as it is in the intra picture coding mode, and calculates a motion compensation error (residual image) that is a differential value between the picture and the motion compensation picture outputted from the motion compensation unit 1543 in the inter picture coding mode.

The orthogonal transformation unit 1513 outputs frequency components in the frequency domain which are resulted by performing orthogonal transformation such as discrete cosine transformation for the picture in the intra picture coding mode and the motion compensation error in the inter picture coding mode, which are outputted from the subtracting unit 1512, respectively. The quantization unit 1514 outputs a quantized value by quantizing the frequency components outputted from the orthogonal transformation unit 1513. The variable length coding unit 1517 outputs a coded signal for which further information compression is performed using a variable length code (Huffman code) which assigns code length to the quantized value outputted from the quantization unit 1514 depending on its occurrence frequency. The post-processing unit 1520 is equipped with a buffer for temporarily memorizing the coded signal or the like, a rate controlling unit for controlling a quantization range in the quantization unit 1514, and others, and transforms the above-mentioned motion vector, picture type or the like, and the coded signal outputted from the variable length coding unit 1517 into a coded signal as a bit stream and outputs it.

The inverse quantization unit 1521 decodes the frequency components by inverse quantizing the quantized value generated by the quantization unit 1514. The inverse orthogonal transformation unit 1522 decodes the picture in the intra picture coding mode and the motion compensation error (residual image) that is the differential value of pixels in the inter picture coding mode, by performing inverse orthogonal transformation of the frequency components decoded by the inverse quantization unit 1521. The adding unit 1524 decodes the picture, by outputting the picture (decoded picture) which is decoded by the inverse orthogonal transformation unit 1522 as it is in the intra picture coding mode, and by adding the residual image which is decoded by the inverse orthogonal transformation unit 1522 and the motion compensation picture which is generated by the motion compensation unit 1543 in the inter picture coding mode.

The switching unit 1530 is comprised of a pair of switches 1531 and 1532 for switching the switching status synchronously under the switch ON/OFF control of the filter processing controlling unit 1560 for every picture, and incorporates the inter pixel filter 1540 into a loop, or omits it from a loop, that is, makes the inter pixel filter 1540 skip its processing. The inter pixel filter 1540 performs spatial low pass filter processing for the decoded picture outputted from the adding unit 1524 on a block by block basis when the switches 1531 and 1532 are ON so as to generate the decoded picture without block distortion or the like. For example, it calculates an average value between a pixel and neighboring pixels, and if the difference between the pixel and a neighboring pixel is within a predetermined range, it executes the processing of replacing every pixel around the block boundary with the calculated average value.

The picture memory 1541 stores a plurality of the decoded pictures outputted from the switching unit 1530. Thereby, it becomes possible to monitor the decoded picture in the same condition as the picture decoding apparatus that decodes the coded signal outputted from the post-processing unit 1520 or use the decoded picture as a reference picture in the inter picture coding mode. Note that in the first IP coding mode and the second IP coding mode, a decoded P-picture to which the information indicating reference possibility is added is always stored in the picture memory 1541, and a decoded P-picture to which the information indicating no reference possibility is added does not need to be stored in the picture memory 1541. Therefore, the information of possibility or no possibility means whether the decoded picture is stored in the picture memory 1541 or not.

In the inter picture coding mode, the motion estimation unit 1542 searches for a reference picture whose difference from the picture outputted from the pre-processing unit 1510 is smallest from among the decoded pictures stored in the picture memory 1541, and outputs a motion vector that is the motion amount of a differential pixel. Note that when the motion vector is outputted, a block prediction type indicating whether the reference picture is a forward picture, a backward picture or the average value between both pictures is outputted. The motion compensation unit 1543 performs the operation indicated by the motion vector and the block prediction type, and generates a motion compensation picture. The priority determining unit 1550 outputs the priority of a picture depending on the picture type, and the base layer or the enhancement layer. The filter processing controlling unit 1560 controls ON/OFF of the switches 1531 and 1532 depending on the priority outputted from the priority determining unit 1550 or the CPU operation rate.

Figure 15:
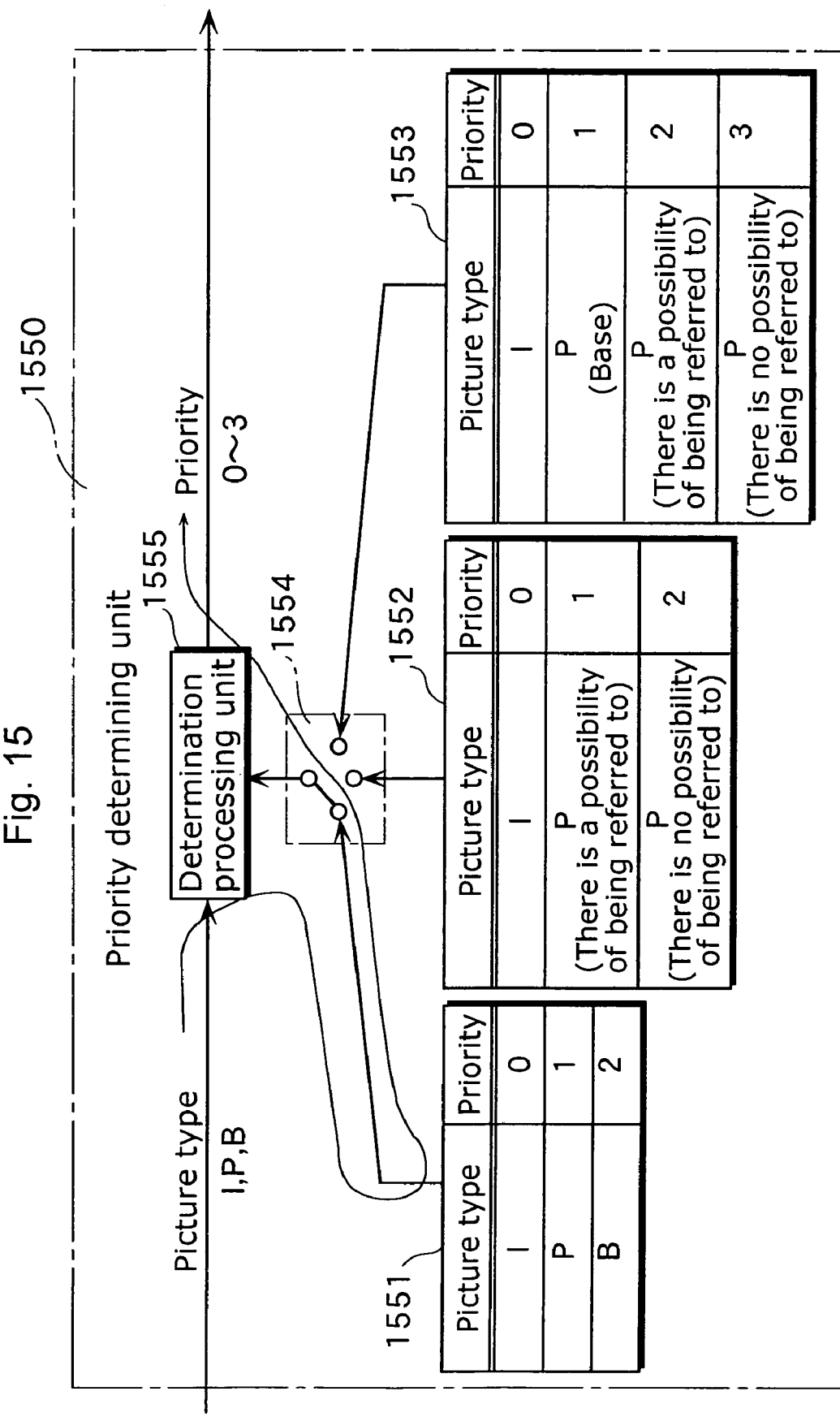
FIG. 15 is a block diagram showing the detailed functional structure of a priority determining unit as shown in FIG. 14.

FIG. 15 is a block diagram showing the detailed functional structure of the priority determining unit 1550 as shown in FIG. 14. As shown in this figure, the priority determining unit 1550 outputs the priority of a picture depending on the picture type and the base layer or the enhancement layer, and is comprised of three tables 1551~1553, a selector 1554 and a determination processing unit 1555, as shown in FIG. 15. Note that in the case of a P-picture in the second IP coding mode, the information indicating "base", "possibility of being referred to" or "no possibility of being referred to" is added to its picture type.

The table 1551 is a table which is selected when the IPB coding mode is designated by the operation on the operation console unit 1505 and in which the picture types of pictures are associated with the priorities thereof, and the priorities are set to "0" for I-pictures, "1" for P-pictures and "2" for B-pictures. Note that the priorities are set so that they become lower as the number becomes larger.

The table 1552 is a table which is selected when the first IP coding mode is designated by the operation on the operation console unit 1505 and in which the picture types of pictures are associated with the priorities thereof, and the priorities are set to "0" for I pictures, "1" for P-pictures (which have a possibility of being referred to) and "2" for P-pictures (which have no possibility of being referred to).

The table 1553 is a table which is selected when the second IP coding mode (base, reference possibility and no reference possibility) is designated, and the priorities are set to "0" for I-pictures, "1" for P-pictures (base), "2" for P-pictures (which have a possibility of being referred to) and "3" for P-pictures (which have no possibility of being referred to).

The selector 1554 selects any one of the tables 1551~1553 based on the coding mode (the IPB coding mode or the first IP coding mode) designated by the operation console unit 1505. The determination processing unit 1555 determines the priority depending on the picture type and the base layer or the enhancement layer outputted from the pre-processing unit 1510 with reference to the table selected by the selector 1554, and outputs the determined priority. Specifically, when the IPB coding mode is designated, the selector 1554 selects the table 1551, and the determination processing unit 1555 outputs the priority associated with an I-picture, a P-picture or a B-picture every time the picture type is outputted from the pre-processing unit 1510. Also, when the first IP coding mode is designated, the selector 1554 selects the table 1552, and the determination processing unit 1555 outputs the priority based on the picture type and the data added to a P-picture ("possibility" or "no possibility"). Further, when the second IP coding mode is designated, the selector 1554 selects the table 1553, and the determination processing unit 1555 outputs the priority based on the picture type and the data added to a P-picture ("base", "possibility" or "no possibility).

Figure 16:
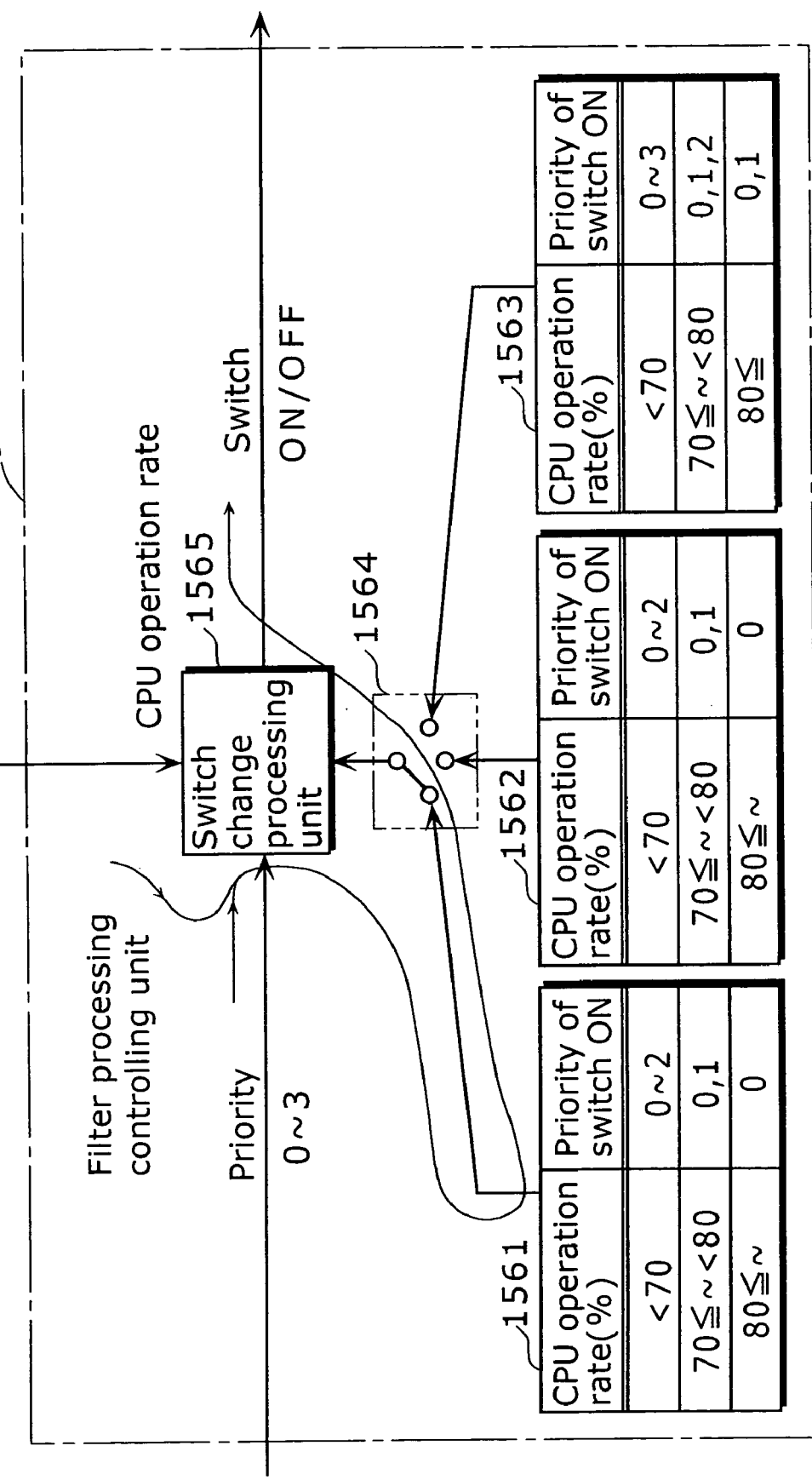
FIG. 16 is a block diagram showing the detailed functional structure of a filter processing controlling unit as shown in FIG. 14.

FIG. 16 is a block diagram showing the detailed functional structure of the filter processing controlling unit 1560 as shown in FIG. 14. As shown in this figure, the filter processing controlling unit 1560 controls ON/OFF of the switches 1531 and 1532 in accordance with the priority outputted from the priority determining unit 1550 and the CPU operation rate, and is comprised of three tables 1561~1563, a selector 1564 and a switch change processing unit 1565, as shown in FIG. 16. The table 1561 is a table which is selected when the IPB coding mode is designated and indicates combinations of the priorities and CPU operation rates for performing filter processing, and it is set to switch ON for the priority 0~2 when the CPU operation rate is less than 70%, switch ON only for the priorities 0 and 1 when the CPU operation rate is 70% or more and less than 80%, and switch ON only for the priority 0 when the CPU operation rate is 80% or more.

The table 1562 is a table which is selected when the first IP coding mode is designated and indicates combinations of the priorities and CPU operation rates for performing filter processing, and it is set to switch ON for the priorities 0~2 when the CPU operation rate is less than 70%, switch ON only for the priorities 0 and 1 when the CPU operation rate is 70% or more and less than 80%, and switch ON only for the priority 0 when the CPU operation rate is 80% or more.

The table 1563 is a table which is selected when the second IP coding mode is designated and indicates combinations of the priorities and CPU operation rates for performing filter processing, and it is set to switch ON for the priorities 0~3 when the CPU operation rate is less than 70%, switch ON only for the priorities 0, 1 and 2 when the CPU operation rate is 70% or more and less than 80%, and switch ON only for the priorities 0 and 1 when the CPU operation rate is 80% or more.

The selector 1564 selects any one of the tables 1561~1563 based on the coding mode (the IPB coding mode, the first IP coding mode or the second IP coding mode) designated by the operation console unit 1505. The switch change processing unit 1565 outputs a signal of switching ON or OFF so as to control the switches 1531 and 1532 of the switching unit 1530 based on the priority outputted from the priority determining unit 1550 and the CPU operation rate acquired by every picture, with reference to the table selected by the selector 1564.

Specifically, when the IPB coding mode is designated, the selector 1564 selects the table 1561, and the switch change processing unit 1565 outputs a signal of switching ON for all the I-picture, P-picture and B-picture if the CPU operation rate is less than 70%. Also, if the CPU operation rate is 70% or more and less than 80%, the switch change processing unit 1565 outputs a signal of switching ON only for an I-picture and a P-picture. Also, if the CPU operation rate is 80% or more, the switch change processing unit 1565 outputs a signal of switching ON only for an I-picture.

Also, when the first IP coding mode is designated, the selector 1564 selects the table 1562, and the switch change processing unit 1565 outputs a signal of switching ON for all the I-picture, P-picture (possibility) and P-picture (no possibility) if the CPU operation rate is less than 70%. Also, if the CPU operation rate is 70% or more and less than 80%, the switch change processing unit 1565 outputs a signal of switching ON only for an I-picture and a P-picture (possibility). Also, if the CPU operation rate is 80% or more, the switch change processing unit 1565 outputs a signal of switching ON only for an I-picture.

Further, when the second IP coding mode is designated, the selector 1564 selects the table 1563, and the switch change processing unit 1565 outputs a signal of switching ON for all the I-picture, P-picture (base), P-picture (possibility) and P-picture (no possibility). Also, if the CPU operation rate is 70% or more and less than 80%, the switch change processing unit 1565 outputs a signal of switching ON only for an I-picture, a P-picture (base) and a P-picture (possibility). Also, if the CPU operation rate is 80% or more, the switch change processing unit 1565 outputs a signal of switching ON only for an I-picture and a P-picture (base).

Next, the operation of the picture coding apparatus 1500 structured as above will be explained.

In the intra picture coding mode for coding a picture as an I-picture, a picture outputted from the pre-processing unit 1510 is compressed and coded into a frequency component by orthogonal transformation by the orthogonal transformation unit 1513, and compressed and coded into a quantized value by quantization by the quantization unit 1514. This quantized value is compressed and coded into a variable length by variable length coding by the variable length coding unit 1517, converted into a coded signal of a bit stream of an I-picture by the post-processing unit 1520, and stored in a memory medium such as a hard disk.

On the other hand, the quantized value outputted from the quantization unit 1514 is decoded into a frequency component by inverse quantization by the inverse quantization unit 1521, and decoded into a picture by inverse orthogonal transformation by the inverse orthogonal transformation unit 1522. When the switches 1531 and 1532 are turned ON under the control of the filter processing controlling unit 1560, this decoded picture is stored in the picture memory 1541 after being filter-processed for eliminating block distortion by the inter pixel filter 1540, and when the switches 1531 and 1532 are OFF, it is stored in the picture memory 1541 without being filter-processed.

Also, in the inter picture coding mode for coding a picture as a P-picture and a B-picture, a motion vector is generated by the motion estimation unit 1542, a motion compensation picture (predictive picture) is generated by the motion compensation unit 1543, and a motion compensation error (differential image) is generated by the subtracting unit 1512. Note that the motion estimation unit 1542 searches for a predictive picture whose difference from the picture outputted from the pre-processing unit 1510 is smallest from among the decoded pictures stored in the picture memory 1541 as one or a plurality of forward or backward reference pictures.

Figure 17A:
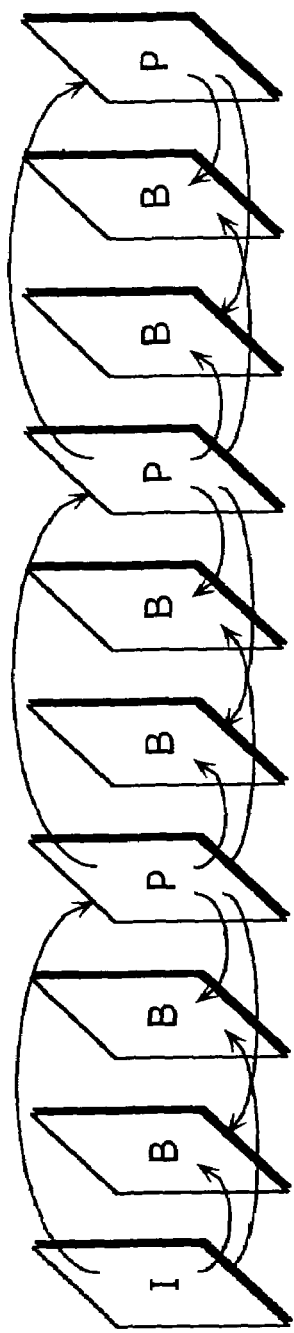
FIG. 17 is a diagram showing reference relations between pictures stored in a picture memory as shown in FIG. 14.
Figure 17B:
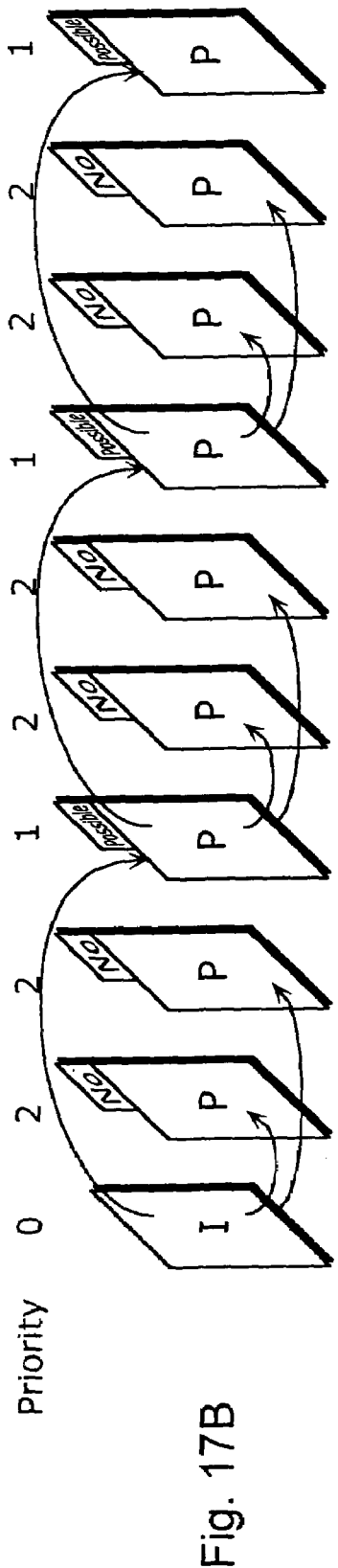
Figure 17C:
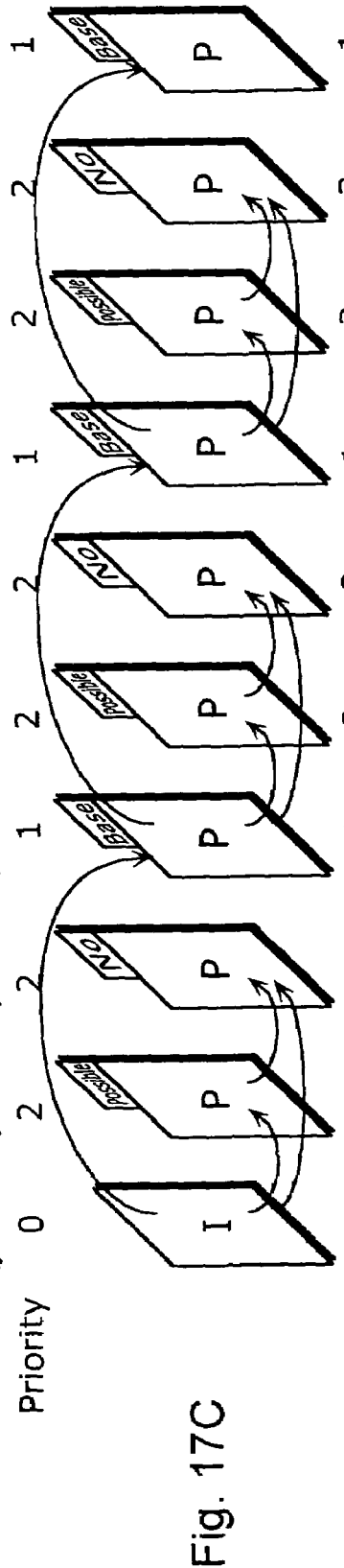

FIG. 17 is a diagram showing reference relations between pictures stored in the picture memory 1541. Particularly, FIG. 17A is a diagram showing reference pictures for prediction in the IPB method, FIG. 17B is a diagram showing reference pictures for prediction in the first IP method, and FIG. 17C is a diagram showing reference pictures for prediction in the second IP method. Note that below each picture of each method, the priority (priority level) associated with the picture is indicated.

For predicting a P-picture in the case of the IPB method of FIG. 17A, a forward I-picture and P-picture can be referred to. For predicting a B-picture, a forward I-picture or P-picture can be referred to and one backward and temporally closest I-picture or P-picture can be referred to.

Note that for predicting a B-picture in H.26L, a B-picture, in addition to an I-picture and a P-picture, can be referred to as a forward picture. In the mode using this B-picture as a reference picture, information that "there is a possibility" or "there is no possibility" is added to the B-picture, and the information that "there is a possibility" or "there is no possibility" is added to the picture type as well. And in this mode, the decoded B-picture to which the information that there is a possibility of being referred to is always stored in the picture memory 1541, and the decoded B-picture to which the information that there is no possibility of being referred to does not need to be stored in the picture memory 1541.

For predicting a P-picture (reference possibility) in the first IP method of FIG. 17B, a forward I-picture and P-picture (reference possibility) can be referred to. For predicting a P-picture (no reference possibility), a forward I-picture or P-picture (reference possibility) can be referred to.

For predicting a P-picture (base) in the second IP method of FIG. 17C, a forward I-picture and P-picture (base) can be referred to. For predicting a P-picture (reference possibility), a forward I-picture and P-picture (base) can be referred to. For predicting a P-picture (no reference possibility), a plurality of forward I-pictures, P-pictures (base) or P-pictures (reference possibility) can be referred to.

Note that, for convenience of explanation, the case where the IPB coding mode is designated will be explained.

Under such restriction, the motion estimation unit 1542 outputs as a motion vector the motion amount of the differential pixel between the searched reference picture and the picture outputted from the pre-processing unit 1510, and also outputs a block prediction type indicating whether a reference picture is a forward picture, a backward picture or an average value of bi-predictive pictures. Also, the motion compensation unit 1543 performs for the differential pixel the operation indicated by the motion vector and the block prediction type outputted from the motion estimation unit 1542 to generate a motion compensation picture. And the subtracting unit 1512 generates a motion compensation error (differential image) by subtracting the motion compensation picture generated by the motion compensation unit 1543 from the picture outputted from the pre-processing unit 1510.

The motion compensation error (differential image) outputted from the subtracting unit 1512 is compressed and coded into a frequency component by orthogonal transformation by the orthogonal transformation unit 1513, and compressed and coded into a quantized value by quantization by the quantization unit 1514. This quantized value is compressed and coded into a variable length by variable length coding by the variable length coding unit 1517, converted into a coded signal in a bit stream of a P-picture or a B-picture together with the motion vector and others by the post-processing unit 1520, and stored in a memory medium such as a hard disk.

On the other hand, the quantized value of a P-picture or a B-picture with a possibility of being referred to which is outputted from the quantization unit 1514 is decoded into a frequency component by inverse quantization by the inverse quantization unit 1521, and decoded into a motion compensation error (differential image) by inverse orthogonal transformation by the inverse orthogonal transformation unit 1522. Then, the adding unit 1524 adds the motion compensation error (differential image) and the motion compensation picture, and thus it is decoded into a picture. This decoded picture is stored in the picture memory 1541 after being filter-processed for eliminating block distortion by the inter pixel filter 1540 when the switches 1531 and 1532 are turned ON under the control of the filter processing controlling unit 1560, and when the switches 1531 and 1532 are turned OFF, it is stored in the picture memory 1541 without being filter-processed.

Here, ON/OFF control of the switches 1531 and 1532 by the filter processing controlling unit 1560 will be explained in more detail.

Figure 18:
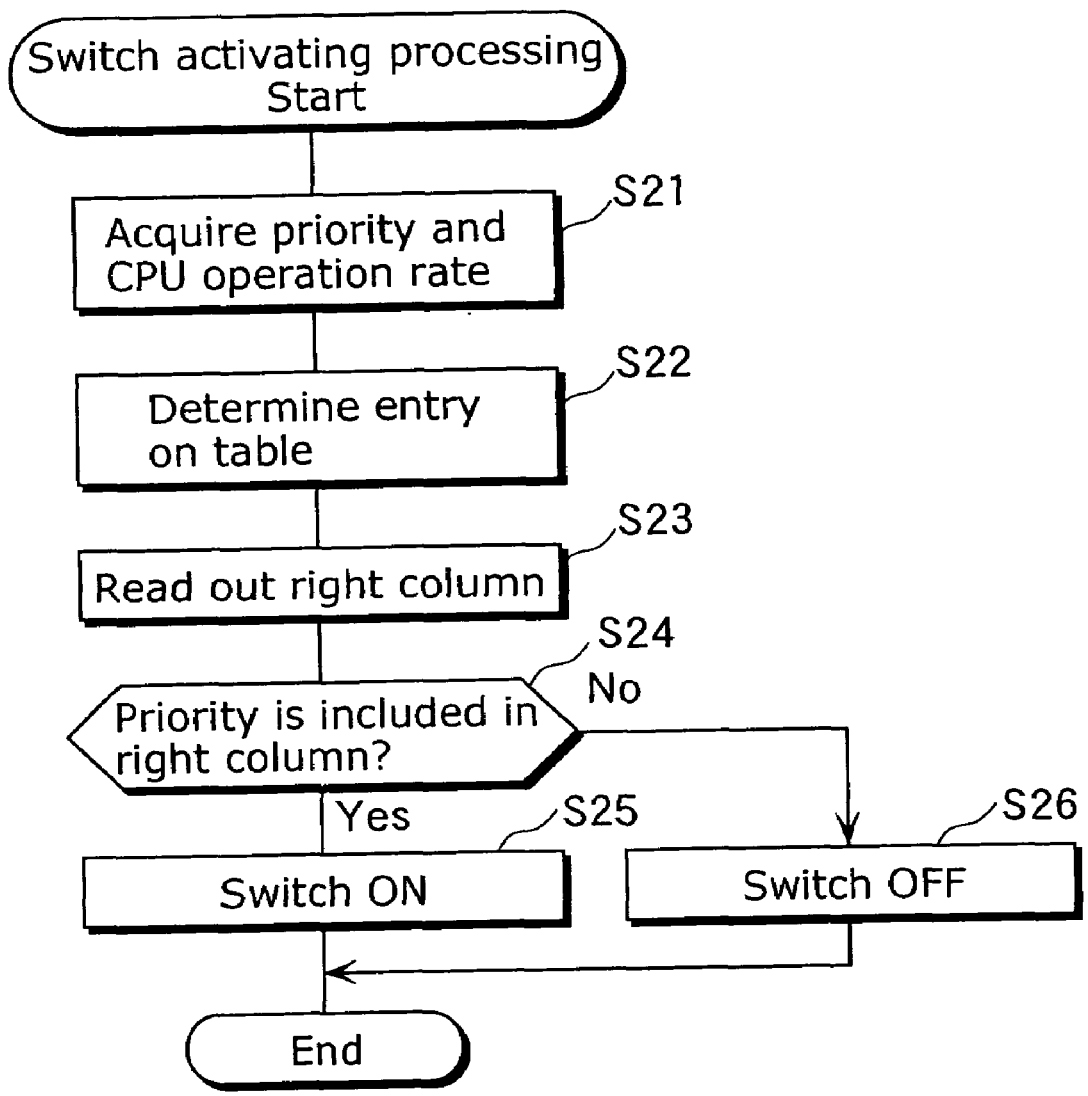
FIG. 18 is a flowchart showing switch activating processing executed by a switch change processing unit as shown in FIG. 16.

FIG. 18 is a flowchart showing switch activating processing executed by the switch change processing unit 1565 in the filter processing controlling unit 1560.

By the way, the determination processing unit 1555 in the priority determining unit 1550 determines the priority of each picture outputted from the pre-processing unit 1510 depending on the picture type with reference to the table 1551 selected by the selector 1554, and outputs the determined priority. Specifically, when the IPB coding mode is designated, the selector 1554 selects the table 1551, and the determination processing unit 1555 outputs the priority "0" for an I-picture, the priority "1" for a P-picture and the priority "2" for a B-picture every time the picture type is outputted from the pre-processing unit 1510.

For every coding of a picture, the switch change processing unit 1565 in the filter processing controlling unit 1560 acquires the priority of the picture and the operation rate of the CPU included in this picture coding apparatus 1500 (S21), and determines the entry which is to be referred to in the table (the table 1561 in the example of FIG. 16) (S22).

Specifically, if the CPU operation rate is less than 70%, it determines that the entry which is to be referred to is the first line, if the CPU operation rate is 70% or more and less than 80%, it determines that the entry which is to be referred to is the second line, and if the CPU operation rate is 80% or more, it determines the entry which is to be referred to is the third line.

After determining the entry which is to be referred to, the switch change processing unit 1565 reads out the right column of the entry (S23), and judges whether the priority set for the picture type of the decoded picture is included in the right column or not (S24). If it is included in the right column (Yes in S24), the switch change processing unit 1565 outputs a signal of switching ON to the switches 1531 and 1532 (S25). Thereby, filter processing is performed for the decoded picture, and the filter-processed decoded picture is stored in the picture memory 1541.

On the contrary, if it is not included in the right column (No in S24), the switch change processing unit 1565 outputs a signal of switching OFF to the switches 1531 and 1532 (S26). Thereby, filter processing for the decoded picture is skipped, and the decoded picture is stored in the picture memory 1541 without being filter-processed.

Such control is performed for each picture, and decoded pictures which have been filter-processed and have not been filter-processed are stored in the picture memory 1541 in sequence. Accordingly, in picture coding, inter pixel filter for noise elimination or the like is not always performed but the inter pixel filter is performed selectively when necessary, so if inter pixel filter is performed only for pictures having serious influence on picture quality, for example, even in a picture decoding apparatus with a low processing capability, it becomes possible to maintain the picture quality of the important pictures which are stored in the picture memory, reduce accumulation of block distortion in the decoded pictures which have been stored in the picture memory, improve prediction efficiency by the motion compensation unit, and reduce deterioration of picture quality more than the MPEG technique, and thus the great effect of improving picture quality can be achieved at a low bit rate.

More specifically, in performing inter pixel filter, priority is given to a picture having great influence on other pictures, that is, an intra coded picture, a forward predictive coded picture, a base layer picture or the like, so the effect of improving picture quality such as noise elimination can be achieved by an inter pixel filter more effectively even with same increase in processing load.

Also, ON/OFF of filter processing can be controlled so as to make full use of the processing capability of the picture coding apparatus, so the CPU is used with high efficiency, and thus coding for higher picture quality can be realized even with the same hardware resources.

FOURTH EMBODIMENT

Figure 19:
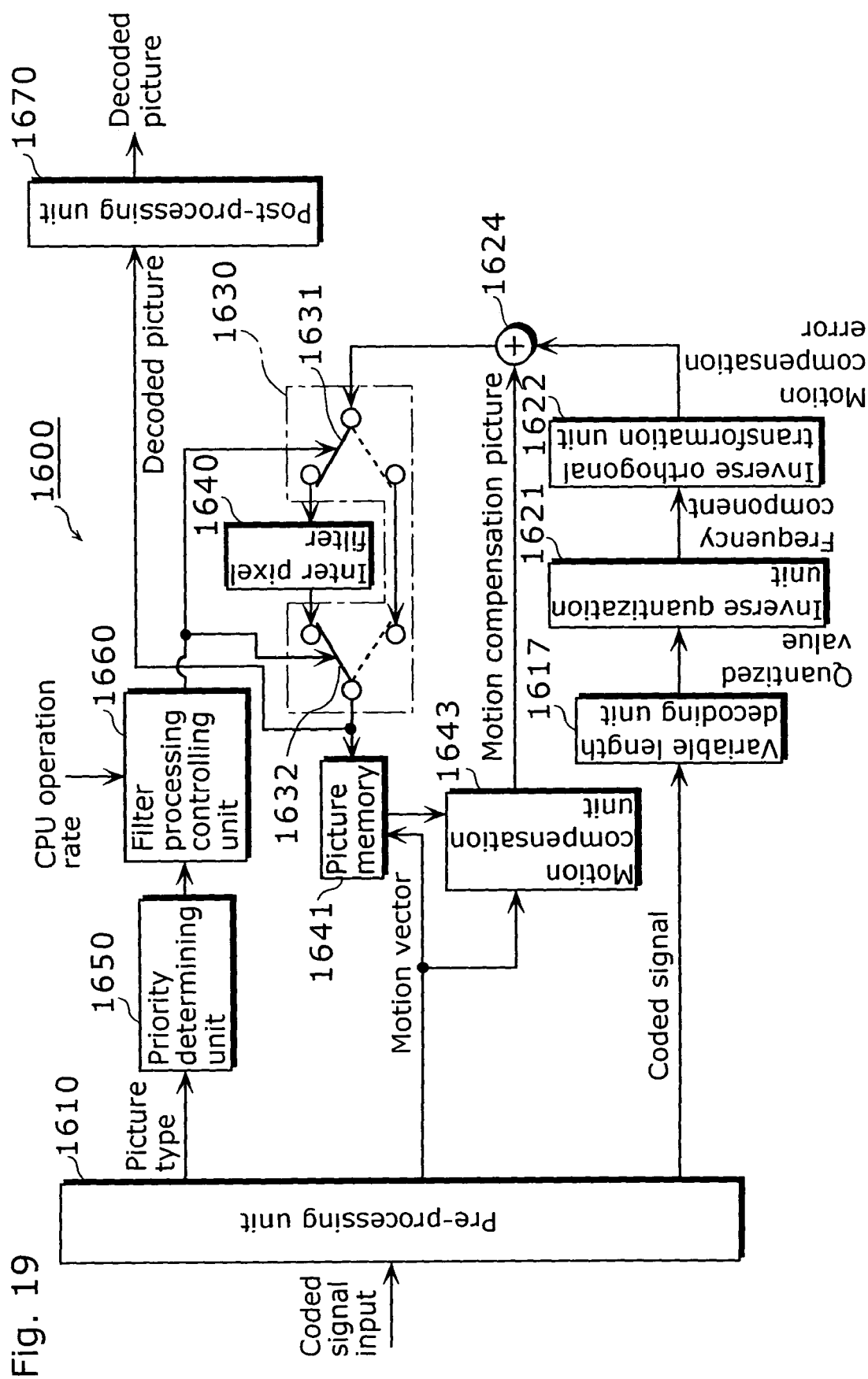
FIG. 19 is a block diagram showing the functional structure of a picture decoding apparatus according to a fourth embodiment of the present invention.

Next, a picture decoding apparatus according to an embodiment of the present invention will be explained. FIG. 19 is a block diagram showing the functional structure of a picture decoding apparatus 1600 according to the fourth embodiment of the present invention.

This picture decoding apparatus 1600 is an apparatus for decoding the coded signal coded by the picture coding apparatus 1500 as shown in FIG. 14, and it is realized by a computer apparatus equipped with a CPU, a memory, a hard disk (HD) in which a program for picture decoding is installed or the like, and, as functions, includes a pre-processing unit 1610, a variable length decoding unit 1617, an inverse quantization unit 1621, an inverse orthogonal transformation unit 1622, an adding unit 1624, a switching unit 1630, an inter pixel filter 1640, a post-processing unit 1670, a picture memory 1641, a motion compensation unit 1643, a priority determining unit 1650 and a filter processing controlling unit 1660.

The pre-processing unit 1610 is equipped with a buffer or the like for storing a coded signal temporarily, and separates it into the picture type, the motion vector and the coded signal of a picture itself included in the coded signal so as to output them. Note that when the coded signal of the picture is the first IP coding mode, the information of "possibility" or "no possibility" is added to the picture, and the information of "possibility" or "no possibility" is also added to the picture type. Also, when it is the second IP coding mode, the information of "base", "possibility" or "no possibility" is added to the picture, and the information of "base", "possibility" or "no possibility" is added to the picture type as well.

The variable length decoding unit 1617 outputs a fixed length quantized value by decoding (Huffman decoding) the coded signal outputted from the pre-processing unit 1610. The inverse quantization unit 1621 decodes the frequency component by inverse quantizing the quantized value outputted from the variable length decoding unit 1617. The inverse orthogonal transformation unit 1622 decodes the picture in the intra picture coding mode and the motion compensation error (residual image) that is a differential value of pixels in the inter picture coding mode by inverse orthogonal transforming the frequency component decoded by the inverse quantization unit 1621.

The adding unit 1624 outputs the picture decoded by the inverse orthogonal transformation unit 1622 as it is in the intra picture coding mode, and decodes the picture by adding the motion compensation error (residual image) decoded by the inverse orthogonal transformation unit 1622 and the motion compensation picture generated by the motion compensation unit 1643 in the inter picture coding mode. The switching unit 1630 is comprised of a pair of switches 1631 and 1632 for switching their switching status synchronously under the switch ON/OFF control of the filter processing controlling unit 1660 for each picture, and incorporates the inter pixel filter 1640 into a loop, or omits it from a loop, that is, makes the inter pixel filter 1640 skip its processing.

The inter pixel filter 1640 performs spatial low pass filter processing for the decoded picture outputted from the adding unit 1624 on a block by block basis when the switches 1631 and 1632 are ON to generate the decoded picture without block distortion or the like. For example, it calculates an average value between a pixel and neighboring pixels, and if the difference between the pixel and the neighboring pixel is within a predetermined range, it executes the processing of replacing every pixel around the block boundary with the calculated average value.

The post-processing unit 1670 is equipped with a format converting unit for converting a format to a predetermined spatial resolution, a picture order restoring unit for restoring the order of the pictures which have been reordered depending on their picture types to the original order thereof, and the like, and outputs the decoded picture to a monitor or the like. The picture memory 1641 stores a plurality of the decoded pictures, with a possibility of being referred to, outputted from the switching unit 1630. The motion compensation unit 1643 performs the operation indicated by the motion vector and the block prediction type outputted from the pre-processing unit 1610 for the decoded pictures stored in the picture memory 1641 to generate motion compensation pictures. The priority determining unit 1650 has the same structure as the priority determining unit 1550 as shown in FIG. 15, and outputs the priority of a picture depending on the picture type outputted from the pre-processing unit 1610 and the base layer or the enhancement layer. The filter processing controlling unit 1660 has the same structure as the filter processing controlling unit 1560 as shown in FIG. 16, and controls ON/OFF of the switches 1631 and 1632 of the switching unit 1630 depending on the priority outputted from the priority determining unit 1650 and the CPU operation rate obtained by monitoring.

Next, the operation of the picture decoding apparatus 1600 structured as above will be explained. Note that, for convenience of explaining it together with the picture coding apparatus 1500, the case where the IPB coding mode is specified will be explained.

In the intra picture decoding mode for decoding a coded signal of an I-picture into a picture, the coded signal outputted from the pre-processing unit 1610 is decoded into a quantized value by variable length decoding by the variable length decoding unit 1617, expanded and decoded into a frequency component by inverse quantization by the inverse quantization unit 1621, and decoded into a picture (decoded picture) by inverse orthogonal transformation by the inverse orthogonal transformation unit 1622. When the switches 1631 and 1632 are turned ON under the control of the filter processing controlling unit 1660, this decoded picture is stored in the picture memory 1641 after being filter-processed for eliminating block distortion by the inter pixel filter 1640, and the order of the picture is restored to the original one in the post-processing unit 1670, the format thereof is converted, and then outputted to a monitor or the like. On the contrary, when the switches 1631 and 1632 are turned OFF, the decoded picture is stored in the picture memory 1641 without being filter-processed, and the order of the picture is restored to the original one in the post-processing unit 1670, the format thereof is converted, and then outputted to a monitor or the like.

Also, in the inter picture decoding mode for decoding coded signals of a P-picture and a B-picture into pictures, the coded signal outputted from the pre-processing unit 1610 is decoded into a quantized value by variable length decoding by the variable length decoding unit 1617, expanded and decoded into a frequency component by inverse orthogonal transformation by the inverse quantization unit 1621, and decoded into a motion compensation error (differential image) by inverse orthogonal transformation by the inverse orthogonal transformation unit 1622.

On the other hand, the motion compensation picture (predictive picture) is generated by the motion compensation unit 1643. Note that the motion compensation unit 1643 performs the operation indicated by the motion vector and the block prediction type outputted from the pre-processing unit 1610 for the differential pixel in the reference picture read out from the picture memory 1641 to generate a motion compensation picture.

And the adding unit 1624 adds the motion compensation error (differential image) and the motion compensation picture to decode the result into a picture. When the switches 1631 and 1632 are turned ON under the control of the filter processing controlling unit 1660, after this decoded picture is filter-processed for eliminating block distortion by the inter pixel filter 1640, and then the order of the picture is restored in the post-processing unit 1670, the format thereof is converted, and the picture is outputted to a monitor or the like, and the decoded picture with a possibility of being referred to is stored in the picture memory 1641. On the other hand, when the switches 1631 and 1632 are turned OFF, filter processing is not performed, but the order of the picture is restored to the original order in the post-processing unit 1670, the format thereof is converted, and the picture is outputted to a monitor or the like, and the decoded picture with a possibility of being referred to is stored in the picture memory 1641. Here, as is the case of the switches 1531 and 1532 of the picture coding apparatus 1500, the ON/OFF of the switches 1631 and 1632 are controlled by the filter processing controlling unit 1660.

More specifically, the switch change processing unit in the filter processing controlling unit 1660 acquires the priority of a picture and the operation rate of a CPU included in this picture decoding apparatus 1600 for every picture coding, determines the entry which is to be referred to on the table for the IPB coding mode, reads out the right column of the entry, and judges whether the priority set for the picture type of the decoded picture is included in the right column or not. If it is included in the right column, the switch change processing unit in the filter processing controlling unit 1660 outputs a signal of switching ON to the switches 1631 and 1632. Thereby, filter processing is performed for the decoded picture, and the filter-processed decoded picture is stored in the picture memory 1641. On the other hand, if it is not included in the right column, the switch change processing unit in the filter processing controlling unit 1660 outputs a signal of switching OFF to the switches 1631 and 1632. Therefore, filter processing for the decoded picture is skipped, and the decoded picture is stored in the picture memory 1641 without being filter-processed.

Such control is performed for each picture, and decoded pictures which have been filter-processed and have not been filter-processed are stored in the picture memory 1641 in sequence.

Accordingly, in picture decoding, inter pixel filter for noise elimination or the like is not always performed but the inter pixel filter is performed selectively when necessary, so if inter pixel filter is performed only for pictures having serious influence on picture quality, for example, even in a picture decoding apparatus with a low processing capability, it becomes possible to maintain the picture quality of the important pictures which are stored in the picture memory, reduce accumulation of block distortion in the decoded pictures which have been stored in the picture memory, improve prediction efficiency by the motion compensation unit, and reduce deterioration of picture quality more than the MPEG technique, and thus the great effect of improving picture quality can be achieved at a low bit rate.

More specifically, in performing inter pixel filter, priority is given to a picture having great influence on other pictures, that is, an intra coded picture, a forward predictive coded picture, a base layer picture or the like, so the effect of improving picture quality such as noise elimination can be achieved by an inter pixel filter more effectively even with the same increase in processing load.

Also, ON/OFF of filter processing can be controlled so as to make full use of the processing capability of the picture decoding apparatus, so the CPU is used with high efficiency, and thus decoding for higher picture quality can be realized even with the same hardware resources.

Note that the present invention can be realized not only as such a picture coding apparatus or a picture decoding apparatus, but also as a picture coding method or a picture decoding method for functioning characteristic units included in these apparatuses as steps, or as a program for having a computer execute those steps. And it is needless to say that the program can be distributed via a recording medium such as a CD-ROM or a transmission medium such as the Internet.

FIFTH EMBODIMENT

In addition, if a program for realizing the structure of the picture coding method or the picture decoding method as shown in each of the above-mentioned embodiments is recorded on a storage medium such as a flexible disk, it becomes possible to perform the processing as shown in each of the above embodiments easily in an independent computer system.

FIG. 20 is an illustration showing the case where the processing is performed in a computer system using a flexible disk which stores the picture coding method or the picture decoding method in the above-mentioned first and second embodiments.

Figure 20A:
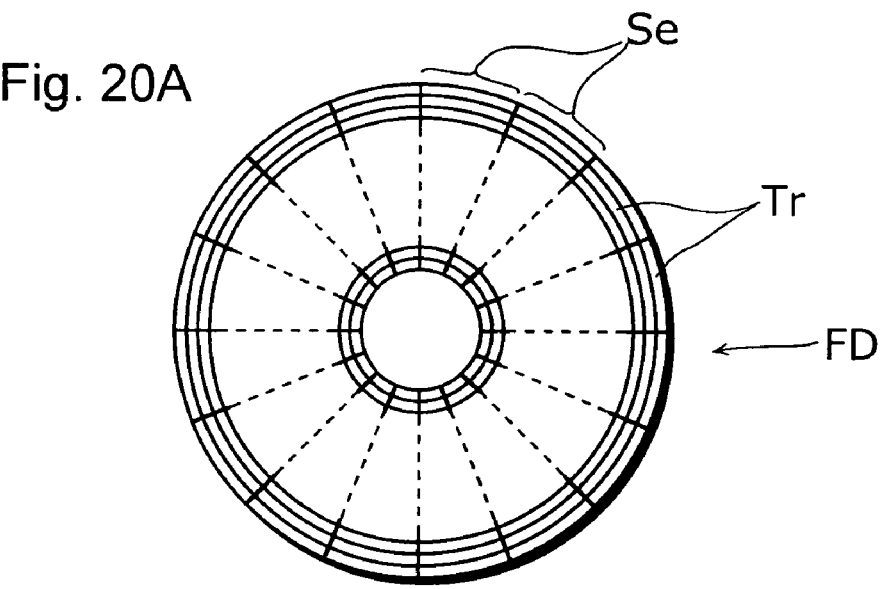
FIG. 20 is an explanatory diagram in the case of implementation by a computer system using a flexible disk storing the picture coding method or the picture decoding method of the above-mentioned first embodiment through the fourth embodiment. A shows an example of a physical format of a flexible disk that is a recording medium main body. B shows the front view of the appearance of the flexible disk, the cross-sectional view thereof and the flexible disk, and C shows the structure for recording and reproducing the above program on the flexible disk FD.
Figure 20B:
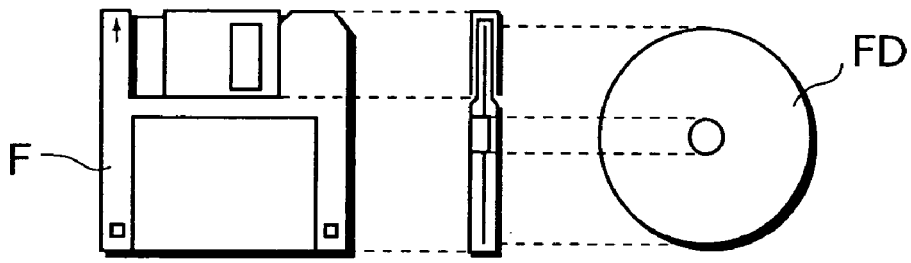

FIG. 20B shows the front view and the cross-sectional view of the appearance of a flexible disk, and the flexible disk, and FIG. 20A shows an example of a physical format of a flexible disk as a recording medium itself. A flexible disk FD is contained in a case F, a plurality of tracks Tr are formed concentrically on the surface of the disk in the radius direction from the periphery, and each track is divided into 16 sectors Se in the angular direction. Therefore, as for the flexible disk storing the above-mentioned program, the picture coding method as the program is recorded in an area allocated for it on the flexible disk FD.

Figure 20C:
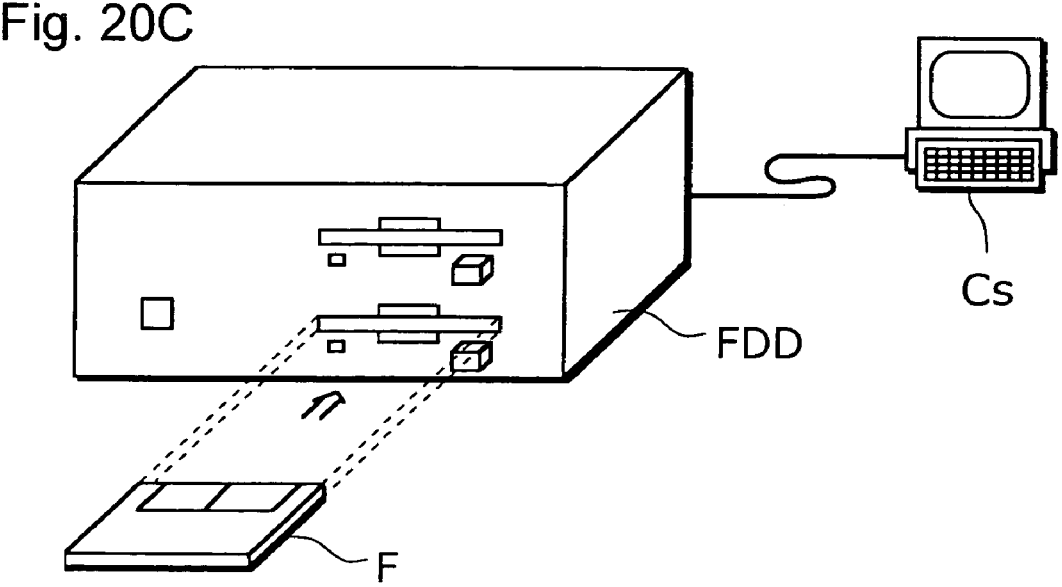

FIG. 20C shows the structure for recording and reproducing the program on and from the flexible disk FD. For recording the program on the flexible disk FD, the computer system Cs writes the picture coding method or the picture decoding method as the program on the flexible disk FD via a flexible disk drive. For constructing the above picture coding method in the computer system by the program recorded on the flexible disk, the program is read out from the flexible disk via the flexible disk drive and transferred to the computer system.

Note that the above explanation is made on the assumption that a recording medium is a flexible disk, but the same processing can also be performed using an optical disk. In addition, the recording medium is not limited to these, but any other mediums such as an IC card and a ROM cassette can be used in the same manner if a program can be recorded on them.

FIG. 21~FIG. 24 are illustrations of the devices for performing the coding or decoding processing as shown in the above-mentioned embodiments, and the system using them.

Figure 21:
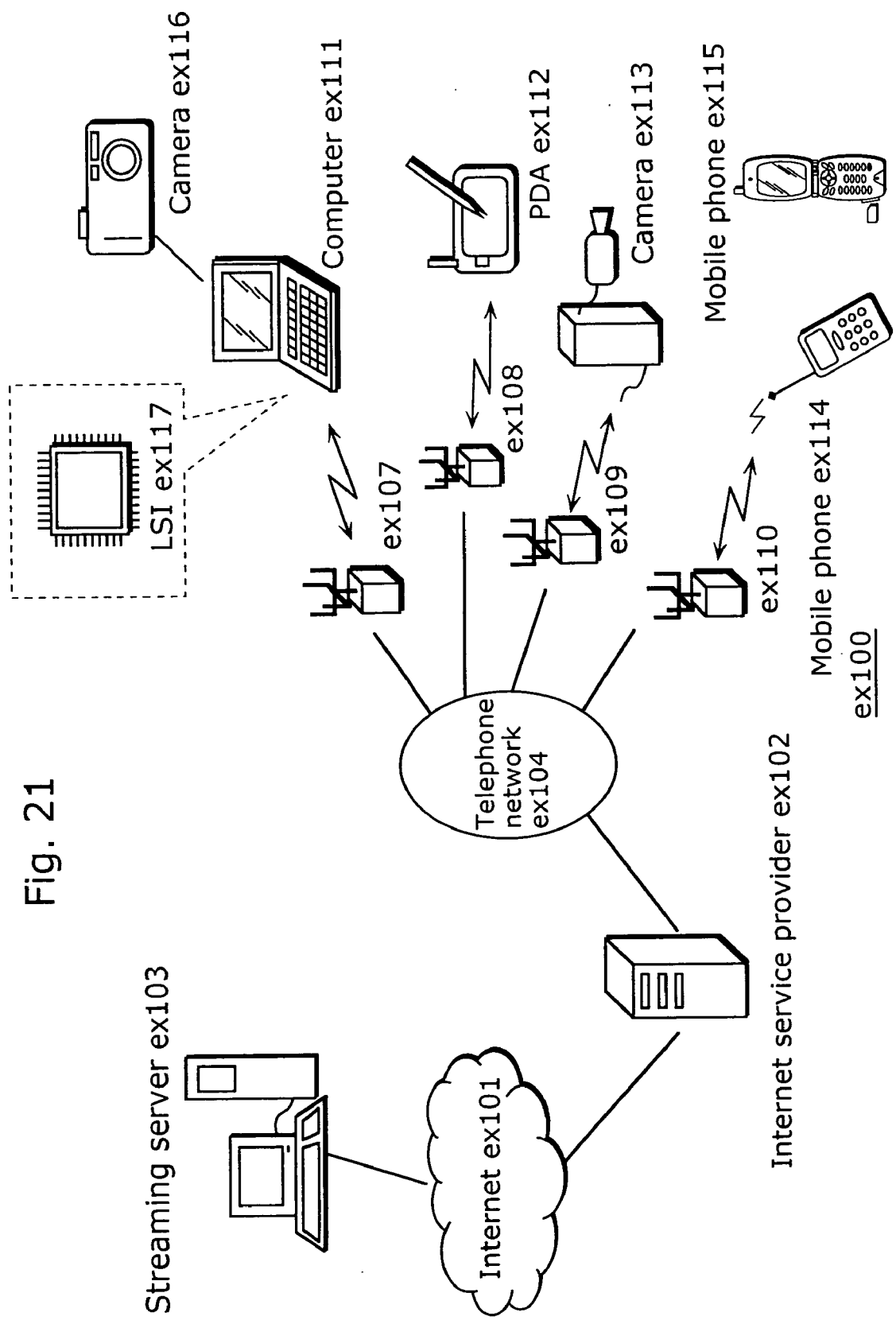
FIG. 21 is a block diagram showing the overall configuration of a content providing system which realizes content distribution services.

FIG. 21 is a block diagram showing the overall configuration of a content providing system ex100 for realizing content distribution service. The area for providing communication service is divided into cells of desired size, and base stations ex107~ex110 are fixed wireless stations are placed in respective cells. This content providing system ex100 is connected to a computer ex111, a PDA (Personal Digital Assistant) ex112, a camera ex113, and a mobile phone ex114 via the Internet ex101, an Internet service provider ex102, and a telephone network ex104, for example. However, the content providing system ex100 is not limited to the combination as shown in FIG. 21, and may be connected to a combination of any of them. Also, it may be connected directly to the telephone network ex104, not through the base stations ex107~ex110 which are the fixed wireless stations.

The camera ex113 is a device such as a digital video camera capable of shooting moving pictures. The mobile phone may be any of a mobile phone of a PDC (Personal Digital Communications) system, a CDMA (Code Division Multiple Access) system, a W-CDMA (Wideband-Code Division Multiple Access) system or a GSM (Global System for Mobile Communications) system, a PHS (Personal Handyphone System) and the like.

Also, a streaming server ex103 is connected to the camera ex113 via the base station ex109 and the telephone network ex104, which enables live distribution or the like using the camera ex113 based on the coded data transmitted from the user. Either the camera ex113 or the server for transmitting the data may code the data shot by the camera. Also, the moving picture data shot by a camera ex116 may be transmitted to the streaming server ex103 via the computer ex111. The camera ex116 is a device such as a digital camera capable of shooting still and moving pictures. In this case, either the camera ex116 or the computer ex111 may code the moving picture data. An LSI ex117 included in the computer ex111 or the camera ex116 performs coding processing. Note that software for coding and decoding pictures may be integrated into any type of a storage medium (such as a CD-ROM, a flexible disk and a hard disk) that is a recording medium which can be read by the computer ex111 or the like. Furthermore, the camera-equipped mobile phone ex115 may transmit the moving picture data. This moving picture data is the data coded by the LSI included in the mobile phone ex115.

Figure 22:
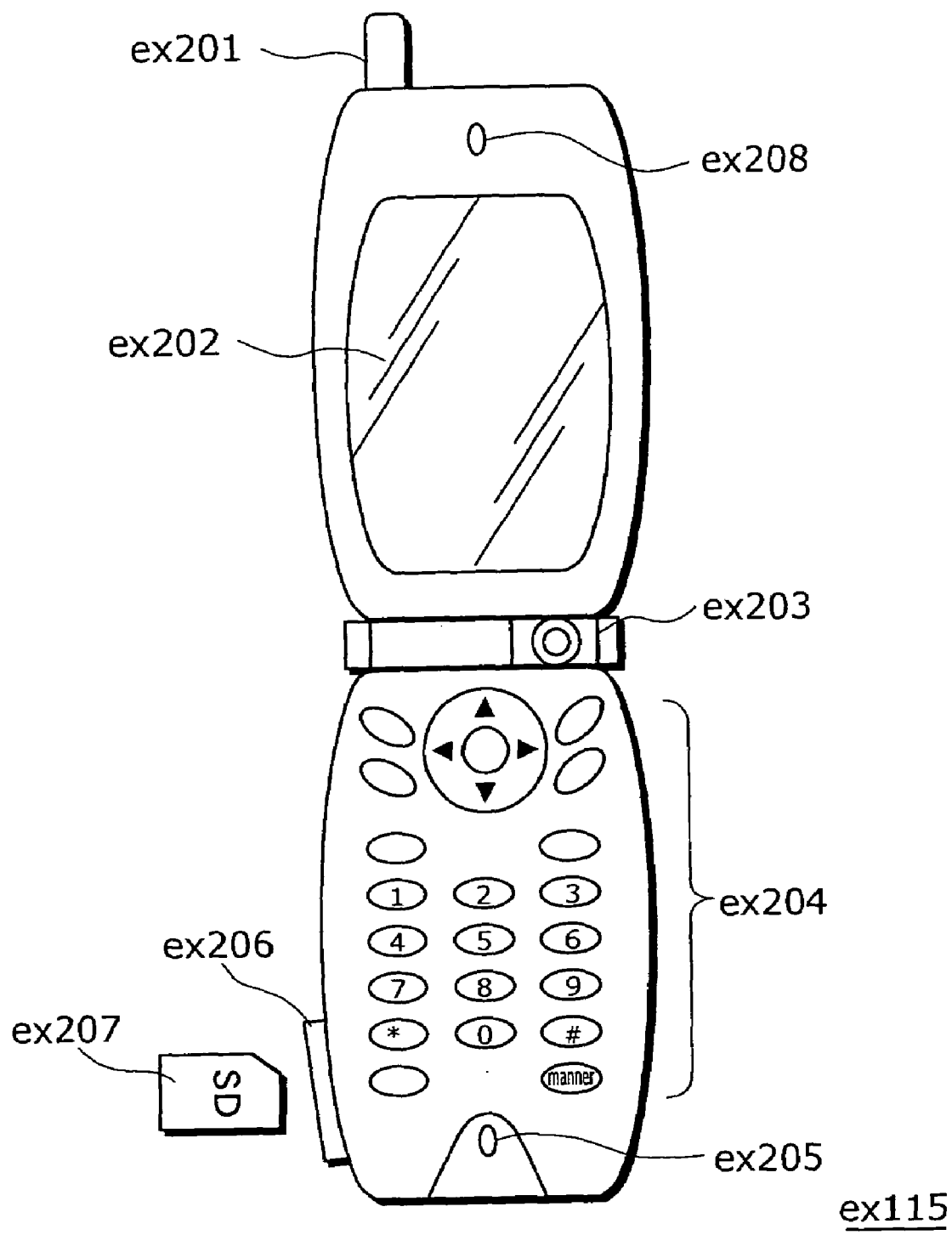
FIG. 22 is a diagram showing an example of the appearance of a mobile phone.

FIG. 22 is a diagram showing an example of the mobile phone ex115. The mobile phone ex115 has an antenna ex201 for sending and receiving radio waves between the base station ex110, a camera unit ex203 such as a CCD camera capable of shooting video and still pictures, a display unit ex202 such as a liquid crystal display for displaying the data obtained by decoding video shot by the camera unit ex203, video received by the antenna ex201, or the like, a main body ex204 including a set of operation keys, a voice output unit ex208 such as a speaker for outputting voices, a voice input unit ex205 such as a microphone for inputting voices, a storage medium ex207 for storing coded or decoded data such as data of moving or still pictures shot by the camera and data of moving or still pictures of received e-mails, and a slot unit ex206 for attaching the storage medium ex207 into the mobile phone ex115. The storage medium ex207 includes a flash memory element, a kind of EEPROM (Electrically Erasable and Programmable Read Only Memory) that is an electrically erasable and rewritable nonvolatile memory, in a plastic case such as an SD card.

In this content providing system ex100, contents (such as a music live video) shot by users using the camera ex113, the camera ex116 or the like are coded in the same manner as the above embodiments and transmitted to the streaming server ex103, while the streaming server ex103 makes stream distribution of the content data to the clients at their request. The clients include the computer ex111, the PDA ex112, the camera ex113, the mobile phone ex114 and so on capable of decoding the above-mentioned coded data. The content providing system ex100 is a system in which, the clients can thus receive and reproduce the coded data, and further can receive, decode and reproduce the data in real time so as to realize personal broadcasting.

Further, the mobile phone ex115 will be explained with reference to FIG. 23. In the mobile phone ex115, a main control unit ex311 for overall controlling each unit of the display unit ex202 and the main body ex204 is connected to a power supply circuit unit ex310, an operation input control unit ex304, a picture coding unit ex312, a camera interface unit ex303, an LCD (Liquid Crystal Display) control unit ex302, a picture decoding unit ex309, a multiplex/demultiplex unit ex308, a record/reproduce unit ex307, a modem circuit unit ex306 and a voice processing unit ex305 to each other via a synchronous bus ex313. When a call-end key or a power key is turned ON by a user's operation, the power supply circuit unit ex310 supplies respective units with power from a battery pack so as to activate the camera-equipped digital mobile phone ex115 for a ready state. In the mobile phone ex115, under the control of the main control unit ex311 including a CPU, ROM and RAM, the voice processing unit ex305 converts the voice signals received by the voice input unit ex205 in conversation mode into digital voice data, the modem circuit unit ex306 performs spread spectrum processing of the digital voice data, and the send/receive circuit unit ex301 performs digital-to-analog conversion and frequency transformation of the data, so as to transmit it via the antenna ex201. Also, in the mobile phone ex115, the data received by the antenna ex201 in conversation mode is amplified and performed of frequency transformation and analog-to-digital conversion, the modem circuit unit ex306 performs inverse spread spectrum processing of the data, and the voice processing unit ex305 converts it into analog voice data, so as to output the result via the voice output unit ex208. Furthermore, when transmitting an e-mail in data communication mode, the text data of the e-mail inputted by operating the operation keys on the main body ex204 is sent out to the main control unit ex311 via the operation input control unit ex304. In the main control unit ex311, after the modem circuit unit ex306 performs spread spectrum processing of the text data and the send/receive circuit unit ex301 performs digital-to-analog conversion and frequency transformation of it, the result is transmitted to the base station ex110 via the antenna ex201.

When picture data is transmitted in data communication mode, the picture data shot by the camera unit ex203 is provided to the picture coding unit ex312 via the camera interface unit ex303. When the picture data is not transmitted, the picture data shot by the camera unit ex203 can also be displayed directly on the display unit 202 via the camera interface unit ex303 and the LCD control unit ex302.

The picture coding unit ex312 compress and codes the picture data provided from the camera unit ex203 by the coding method as shown in the above-mentioned embodiments so as to transform it into coded picture data, and sends it out to the multiplex/demultiplex unit ex308. At this time, the mobile phone ex115 sends out the voices received by the voice input unit ex205 during picture pickup by the camera unit ex203 to the multiplex/demultiplex unit ex308 as digital voice data via the voice processing unit ex305.

The multiplex/demultiplex unit ex308 multiplexes the coded picture data provided from the picture coding unit ex312 and the voice data provided from the voice processing unit ex305 by a predetermined method, the modem circuit unit ex306 performs spread spectrum processing of the resulting multiplexed data, and the send/receive circuit unit ex301 performs digital-to-analog conversion and frequency transformation of the result for transmitting via the antenna ex201.

As for receiving data of a moving picture file which is linked to a Website or the like in data communication mode, the modem circuit unit ex306 performs inverse spread spectrum processing of the data received from the base station ex110 via the antenna ex201, and sends out the resulting multiplexed data to the multiplex/demultiplex unit ex308.

In order to decode the multiplexed data received via the antenna ex201, the multiplex/demultiplex unit ex308 demultiplexes the multiplexed data into coded picture data and voice data, and provides the coded picture data to the picture decoding unit ex309 and the voice data to the voice processing unit ex305 respectively via the synchronous bus ex313.

Next, the picture decoding unit ex309 decodes the coded picture data by the decoding method paired with the coding method as shown in the above-mentioned embodiments, so as to generate reproduced moving picture data, and provides this data to the display unit ex202 via the LCD control unit ex302, and thus moving picture data included in a moving picture file linked to a Website, for instance, is displayed. At the same time, the voice processing unit ex305 converts the voice data into analog voice data, and provides this data to the voice output unit ex208, and thus voice data included in a moving picture file linked to a Website, for instance, is reproduced.

Figure 24:
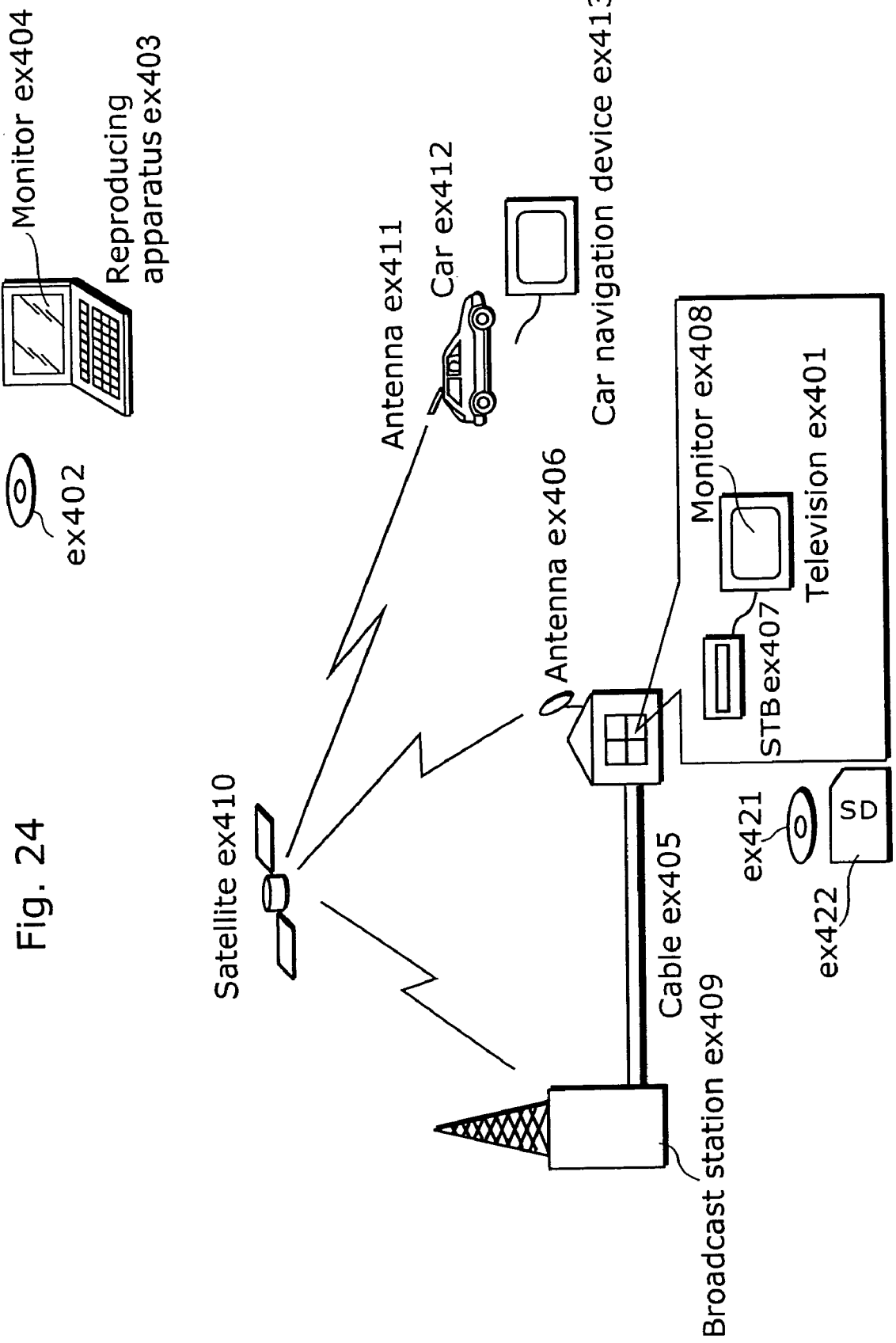
FIG. 24 is a diagram explaining devices that perform the coding processing or decoding processing as shown in the above-mentioned embodiments and a system using these devices.

The present invention is not limited to the above-mentioned system. Ground-based or satellite digital broadcasting has been in the news lately, and at least either the picture coding method or the picture decoding method in the above-mentioned embodiments can be incorporated into such a digital broadcasting system as shown in FIG. 24. More specifically, a coded bit stream of video information is transmitted from a broadcast station ex409 to or communicated with a broadcast satellite ex410 via radio waves. Upon receipt of it, the broadcast satellite ex410 transmits radio waves for broadcasting, a home antenna ex406 with a satellite broadcast reception function receives the radio waves, and an apparatus such as a television (receiver) ex401 or a set top box (STB) ex407 decodes the coded bit stream for reproduction. The picture decoding apparatus as shown in the above-mentioned embodiments can be implemented in the reproducing apparatus ex403 for reading a coded bit stream recorded on a storage medium ex402 that is a recording medium such as a CD and DVD and decoding it. In this case, the reproduced video signals are displayed on a monitor ex404. It is also conceived to implement the picture decoding apparatus in the set top box ex407 connected to a cable ex405 for a cable television or the antenna ex406 for satellite and/or ground-based broadcasting so as to reproduce them on a monitor ex408 of the television ex401. The picture decoding apparatus may be incorporated into the television, not in the set top box. Or, a car ex412 having an antenna ex411 can receive signals from the satellite ex410, the base station ex107 or the like for reproducing moving pictures on a display apparatus such as a car navigation device ex413 or the like in the car ex412.

Furthermore, the picture coding apparatus as shown in the above-mentioned embodiments can code picture signals for recording on a recording medium. As a concrete example, there is a recorder ex420 such as a DVD recorder for recording picture signals on a DVD disk ex421 and a disk recorder for recording them on a hard disk. They can also be recorded on an SD card ex422. If the recorder ex420 includes the picture decoding apparatus as shown in the above-mentioned embodiments, the picture signals recorded on the DVD disk ex421 or the SD card ex422 can be reproduced for display on the monitor ex408.

Figure 23:
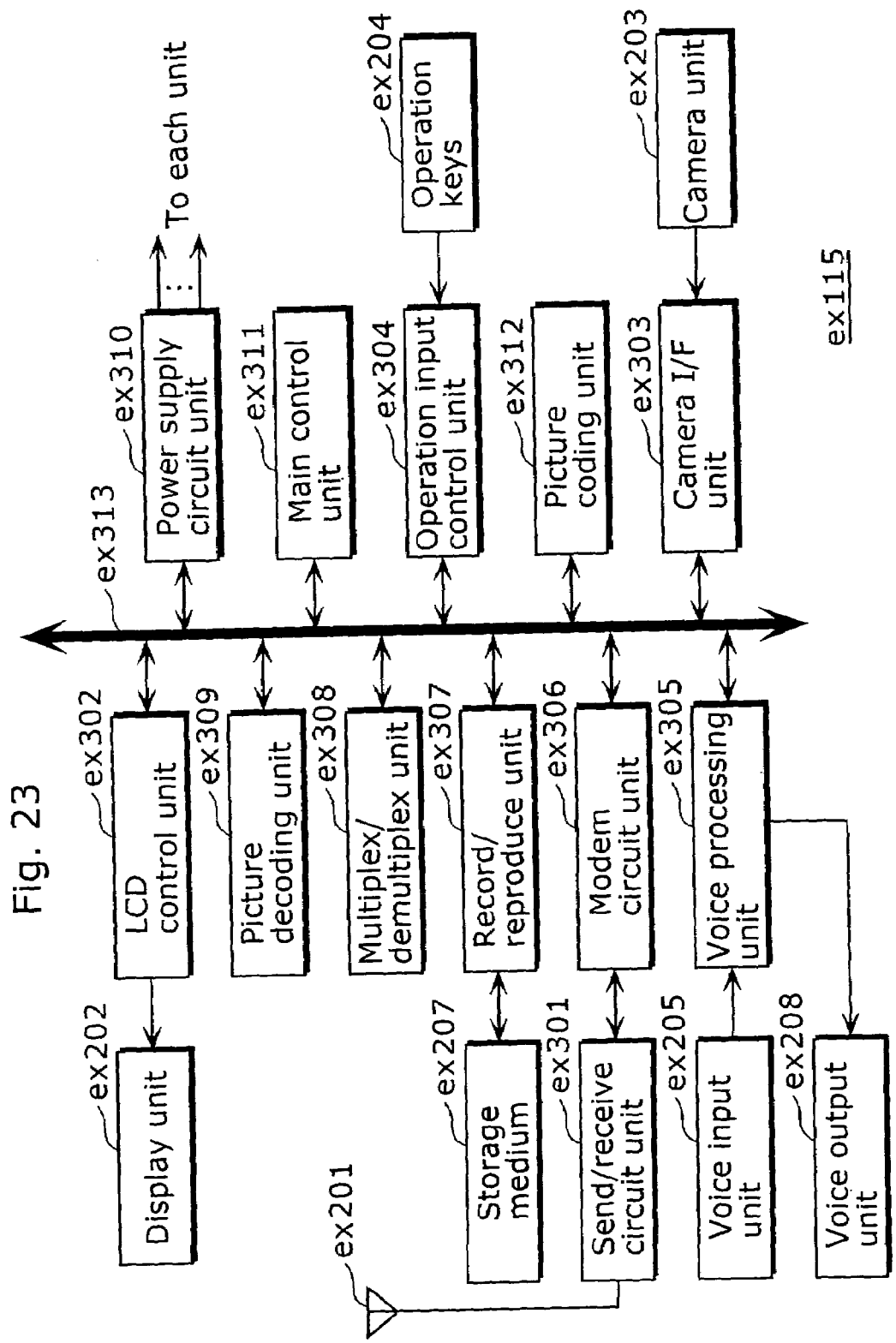
FIG. 23 is a block diagram showing the structure of the mobile phone.

Note that although the structure of the car navigation device ex413 is same as that of the mobile phone ex115 as shown in FIG. 23, for example, the structure without the camera unit ex203, the camera interface unit ex303 and the picture coding unit ex312, out of the units as shown in FIG. 23, is conceivable. The same applies to the computer ex111, the television (receiver) ex401 and others.

In addition, three types of implementations can be conceived for a terminal such as the above-mentioned mobile phone ex114; a sending/receiving terminal equipped with both an encoder and a decoder, a sending terminal equipped with an encoder only, and a receiving terminal equipped with a decoder only.

As described above, it becomes possible to realize any type of apparatus or system as shown in the present embodiment by implementing the coding method and decoding method as shown in the present specification.

INDUSTRIAL APPLICABILITY

The picture coding apparatus according to the present invention is useful as a picture coding apparatus which is included in a personal computer, a PDA and a mobile phone with a communication function.

Also, the picture decoding apparatus according to the present invention is useful as a picture decoding apparatus which is included in a personal computer, a PDA and a mobile phone with a communication function.

The invention claimed is:

1. A method for decoding coded data, said method comprising:

decoding coded data to obtain a decoded picture with or without using a predictive picture, wherein the predictive picture is generated by referring to a reference picture;

changing a filtering of the decoded picture based upon information indicating whether the predictive picture was used for said decoding of the coded data; and storing the decoded picture, which is filtered, for use as a reference picture to decode a following coded data, wherein a smoothing level of the filtering performed when the decoded picture is obtained by decoding the coded data without using the predictive picture is higher than a smoothing level of the filtering performed when the decoded picture is obtained by decoding the coded data with using the predictive picture.

* * * * *